United States Patent
Katsuo et al.

(10) Patent No.: US 8,611,729 B2
(45) Date of Patent: Dec. 17, 2013

(54) CONVERTION APPARATUS AND CONVERTION METHOD

(75) Inventors: Satoshi Katsuo, Kanagawa (JP); Hideki Ando, Kanagawa (JP); Hisao Tanaka, Tokyo (JP); Takashi Furukawa, Kanagawa (JP); Masaki Hirose, Kanagawa (JP); Takayoshi Kawamura, Kanagawa (JP); Motohiro Terao, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/485,067

(22) Filed: May 31, 2012

(65) Prior Publication Data

US 2012/0242894 A1 Sep. 27, 2012

Related U.S. Application Data

(63) Continuation of application No. 10/665,090, filed on Sep. 18, 2003, now Pat. No. 8,326,128.

(30) Foreign Application Priority Data

Sep. 19, 2002 (JP) ................ P2002-273080

(51) Int. Cl.
*H04N 5/93* (2006.01)

(52) U.S. Cl.
USPC ......................................... 386/284; 386/285

(58) Field of Classification Search
None
See application file for complete search history.

(56) References Cited

U.S. PATENT DOCUMENTS

| 2001/0043784 | A1* | 11/2001 | Shirata et al. ............ 386/21 |
| 2002/0164149 | A1* | 11/2002 | Wilkinson ................ 386/46 |
| 2003/0233379 | A1* | 12/2003 | Cohen et al. ............. 707/200 |

FOREIGN PATENT DOCUMENTS

| EP | 1 241 848 | 9/2002 |
| GB | 2 371 889 | 8/2002 |
| JP | 10-210414 | 8/1998 |
| JP | 2001-184840 | 7/2001 |
| JP | 2001-229616 | 8/2001 |
| JP | 2001-257981 | 9/2001 |
| WO | PCT/GB01/03967 | 3/2002 |
| WO | WO 02 21845 | 3/2002 |

OTHER PUBLICATIONS

Al Kovalick: "Material Exchange Format FAQ", Pinnacle Systems, May 20, 2002, pp. 1-4, XP002276055, Retrieved from the Internet: URL://http://www.Pinnaclesys.com/BSD/mediastream900fornetworkedslong/English(US)docMXB%20faq%20in%20wp%20format%205%200%.pdf>.

Hans Hoffmann: "File Exchange Formats for Networked television production", IBU Technical Department, Jul. 2002, pp. 1-8, XP002276056, Retrieved from the Internet: URL://http://www.edu.ch/trey_291-hoffmann.pdf>.

Bruce Devlin: "MXF—the Material Exchange Format", EBU Technical Review Jul. 2002, pp. 1-7, XP002276057, Retrieved from the Internet: URL:http://www.ebu.ch/trey_291-devlin.pdf>.

* cited by examiner

*Primary Examiner* — Huy T Nguyen
*Assistant Examiner* — Eileen Adams
(74) *Attorney, Agent, or Firm* — Frommer Lawrence & Haug LLP; William S. Frommer

(57) ABSTRACT

A conversion apparatus and method is disclosed by which a file including data multiplexed therein can be edited or handled readily while maintaining the compatibility. A standard/independent conversion section converts a file of a standard AV multiplex format wherein video data and audio data are placed in a multiplexed state in a body into a file of an AV independent format wherein video data or audio data are placed collectively in a body. Meanwhile, an independent/standard conversion section converts a file of the AV independent formation into a file of the standard AV multiplex format.

15 Claims, 20 Drawing Sheets

CONVERTION APPARATUS AND CONVERTION METHOD

This application is a continuation of application Ser. No. 10/665,090, filed on Sep. 18, 2003, now U.S. Pat. No. 8,326,128 which claims priority to Japanese Application No. W2002-273080 filed on Sep. 19, 2002, the entirety of which are hereby incorporated by reference herein.

BACKGROUND OF THE INVENTION

This invention relates to file conversion.

In recent years, standardization of the communication protocol and reduction in cost of communication apparatus and so forth have proceeded, and personal computers, which include a communication interface (I/F) as a standard function, have been popularized.

In addition to personal computers, also broadcasting apparatus for business use such as, for example, Audio Visual (AV) servers and Video Tape Recorders (VTRs) are often equipped with, or are capable of equipped with, a communication interface as a standard function. File exchange of video data or audio data is performed between such broadcasting apparatus of the type just described. It is to be noted that video data and audio data are hereinafter referred to suitably and collectively as AV data.

Incidentally, a file conventionally exchanged between broadcasting apparatus usually has a format unique to, for example, each model or each maker. Therefore, it is conventionally difficult to perform file exchange between broadcasting apparatus of different models or different makers.

Thus, for example, the Material Exchange Format (MXF) has been proposed and is being standardized as a format for file exchange.

The MXF takes not only file exchange but also streaming into consideration and includes video data and audio data multiplexed in small units such as frames. The MXF is described, for example, in Bruce Devlin, Snell & Wilcox, G-FORS MXF document controller, "MXF information centre", [online], [searched on Sep. 19, 2002], Internet, <URL: http://www.g-fors.com/mxf.htm>.

The MXF includes video data and audio data multiplexed for each frame taking the streaming into consideration as described above. Therefore, the MXF has a subject to be solved in that it is difficult to use a broadcasting apparatus to edit video data and audio data independently of each other (AV independent editing) after a file of the MXF is fetched into a storage.

A method is available wherein a broadcasting apparatus converts a file of the MXF into a file of a unique format after fetching the file of the MXF. However, if a broadcasting apparatus converts a file of the MXF into a file of a unique format quite independent of the MXF and stores the file of the unique format into a storage, then it is difficult to handle the file on another broadcasting apparatus.

In particular, for example, a file of a unique format recorded in a storage of a certain broadcasting apparatus may be accessed from some other broadcasting apparatus through a communication interface such as, for example, the Institute of Electrical and Electronics Engineers (IEEE) or the Universal Serial Bus (USB). In this instance, however, if the latter broadcasting apparatus is not ready for the unique format, then it cannot handle the file of the unique format. Here, the broadcasting apparatus cannot, for example, read out the file of the unique format.

Meanwhile, where a storage of a certain broadcasting apparatus into which a file of a unique format is to be recorded is a removable recording medium such as, for example, an optical disk, the removable recording medium may be loaded into another broadcasting apparatus. Also in this instance, if the latter broadcasting apparatus is not ready for the unique format, then it cannot handle the file of the unique format either.

SUMMARY OF THE INVENTION

It is an object of the present invention to provide a conversion apparatus and a conversion method by which a file including video data, audio data, and some other data multiplexed therein can be edited or handled readily while maintaining the compatibility.

In order to attain the object described above, according to an aspect of the present invention, there is provided a conversion apparatus for converting a file of a format including a header, a body, and a footer. The apparatus includes conversion means for converting one of a file of a first format, which includes first and second data placed in a multiplexed state in the body thereof, and a file of a second format, which includes first or second data collectively placed in the body thereof, into the other of the files.

According to another aspect of the present invention, there is provided a conversion method for converting a file of a format including a header, a body, and a footer. The method includes the steps of receiving one of a file of a first format wherein first and second data are placed in a multiplexed state in the body and a file of a second format wherein first or second data are placed collectively in the body, and converting one of the file of the first format and the file of the second format into the other of the files.

According to a further aspect of the present invention, there is provided a program for causing a computer to execute a conversion method for converting a file of a format including a header, a body, and a footer. The program includes a conversion step of converting one of a file of a first format, which includes first and second data placed in a multiplexed state in the body thereof, and a file of a second format, which includes first or second data collectively placed in the body thereof, into the other of the files.

According to a still further aspect of the present invention, there is provided a data structure of a file of a format including a header, a body, and a footer. The data structure includes a video file wherein a header and a footer are added to a body in which video data are placed collectively, audio files for a plurality of channels in each of which a header and a footer are added to a body in which audio data of the channel are placed, and a master file describing a pointer to the video file and pointers to the individual audio files of the channels.

BRIEF DESCRIPTION OF THE DRAWINGS

These and other objects of the invention will be seen by reference to the description, taken in connection with the accompanying drawing, in which.

DETAILED DESCRIPTION OF THE PREFERRED EMBODIMENT

Figure 1:
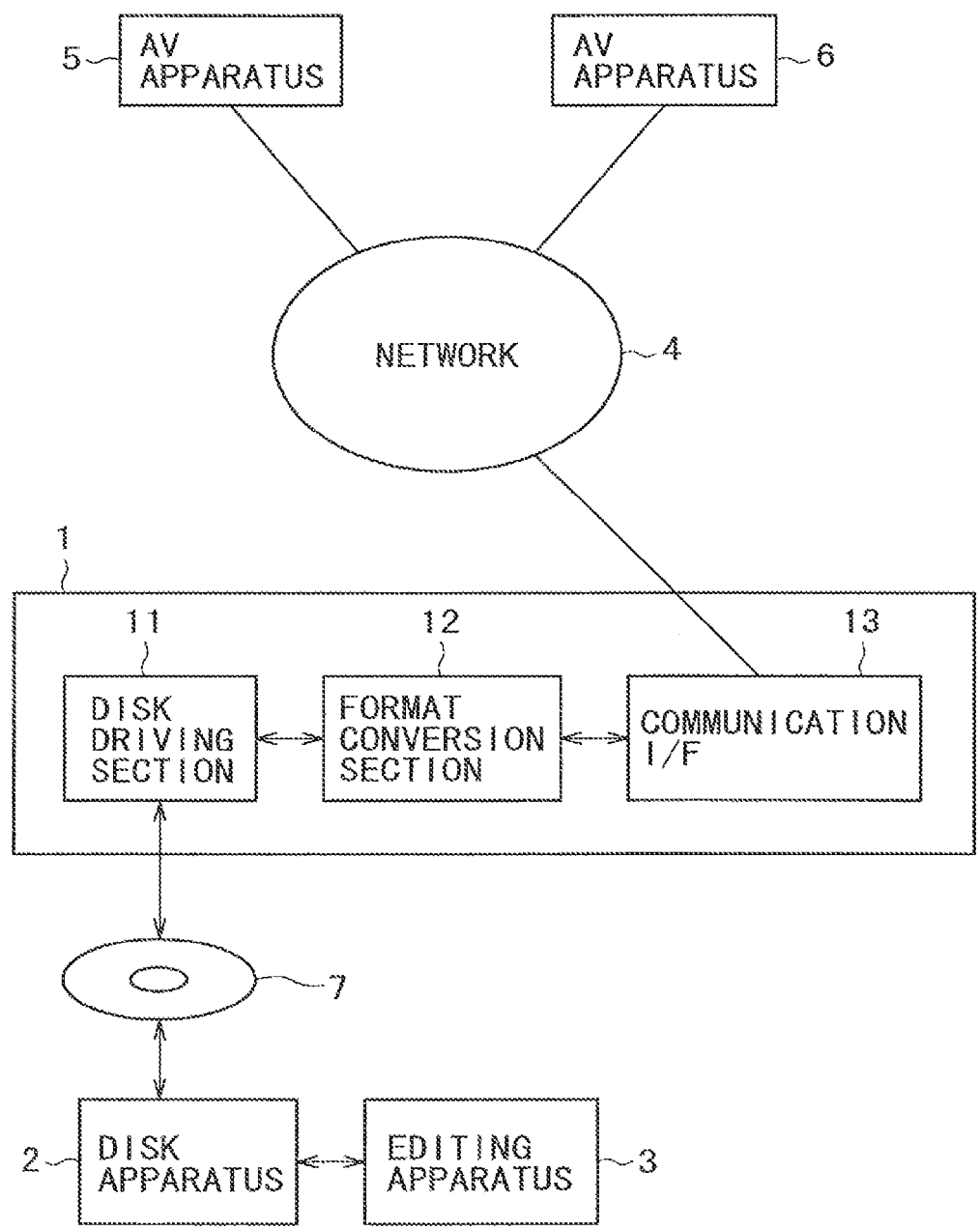
FIG. 1 is a block diagram showing an example of a configuration of an AV network system to which the present invention is applied.

Referring first to FIG. 1, there is shown an example of a configuration of an AV network system to which the present invention is applied. It is to be noted that the term "system" is used to represent a logical set of a plurality of apparatus irrespective of whether or not the components are accommodated in the same housing.

The AV network system shown includes a disk apparatus 1 which in turn includes a disk driving section 11, a format conversion section 12, and a communication interface (I/F) 13. The disk apparatus 1 receives a file of AV data transmitted through a network 4 and records the file onto an optical disk 7. Further, the disk apparatus 1 reads out a file of AV data recorded on the optical disk 7 and transmits the file through the network 4.

An optical disk 7 can be removably loaded into a disk driving section 11. The disk driving section 11 drives the optical disk 7 loaded therein to record (write) a file of an AV independent format hereinafter described onto the optical disk 7. Further, the disk driving section 11 drives the optical disk 7 to read out a file of the AV independent format from the optical disk 7 and supplies the file to the format conversion section 12.

The format conversion section 12 converts the file of the AV independent format supplied thereto from the disk driving section 11 into a file of a standard AV multiplex format hereinafter described and supplies the resulting file to the communication interface 13. Further, the format conversion section 12 converts a file of the standard AV multiplex format supplied thereto from the communication interface 13 into a file of the AV independent format and supplies the resulting file to the disk driving section 11.

The communication interface 13 may be formed from an Institute of Electrical and Electronics Engineers (IEEE) 13.94 port, a Universal Serial Bus (USB) port, or a Network Interface Card (NIC) for connection of a Local Area Network (LAN). Alternatively, the communication interface 13 may be formed from an analog modem, a Terminal Adapter (TA) and a Digital Service Unit (DSU), an Asymmetric Digital Subscriber Line (ADSL) modem, or some other interface. The communication interface 13 communicates a file of the standard AV multiplex format through the network 4 such as, for example, the Internet or an intranet. In particular, the communication interface 13 transmits a file of the standard AV multiplex format supplied thereto from the format conversion section 12 through the network 4. Further, the communication interface 13 receives a file of the standard AV multiplex format transmitted thereto through the network 4 and supplies the file to the format conversion section 12.

In the disk apparatus 1 having the configuration described above, the communication interface 13 receives a file of the standard AV multiplex format transmitted thereto through the network 4 and supplies the file to the format conversion section 12. The format conversion section 12 converts the file of the standard AV multiplex format from the communication interface 13 into a file of the AV independent format and supplies the resulting file to the disk driving section 11. The disk driving section 11 records the file of the AV independent multiplex format from the format conversion section 12 onto an optical disk 7 loaded therein.

Further, in the disk apparatus 1, the disk driving section 11 reads out a file of the AV independent format from an optical disk 7 loaded therein and supplies the file to the format conversion section 12. The format conversion section 12 converts the file of the AV independent format from the disk driving section 11 into a file of the standard AV multiplex format and supplies the resulting file to the communication interface 13. The communication interface 13 transmits the file of the standard AV multiplex format from the format conversion section 12 through the network 4.

A file of the standard AV multiplex format conforms to, for example, the standards of the MXF and includes a header, a body, and a footer. Since a file of the standard AV multiplex format conforms to the standards of the MXF, the body thereof includes video data and audio data as AV data placed in a multiplexed state in a unit of, for example, one frame therein.

Referring to FIG. 1, AV apparatus 5 and 6 connected to the network 4 are apparatus that conform to the standards of the MXF and can therefore handle a file conforming to the standards of the MXF. Accordingly, each of the AV apparatus 5 and 6 can transmit a file of the standard AV multiplex format to the disk apparatus 1 through the network 4. Further, each of the AV apparatus 5 and 6 can receive a file of the standard. AV multiplex format transmitted thereto from the disk apparatus 1. In other words, the disk apparatus 1 and the AV apparatus 5 and 6 can exchange a file of the standard AV multiplex format therebetween through the network 4. Further, each of the AV apparatus 5 and 6 can perform various processes such as streaming reproduction of a received file of the standard AV multiplex format.

It is to be noted that an apparatus conforming to the existing standards of the MXF like the AV apparatus 5 and 6 is hereinafter referred to suitably as standard apparatus.

Meanwhile, a file of the AV independent format includes a header, a body, and a footer similarly as in a file of the standard AV multiplex format. However, the body has a form different from that of the body of a file of the standard AV multiplex format. In particular, in a file of the AV independent format, video data and audio data are placed in different files from each other. While the video file, which is a file of video data, has a header and a footer of the same form as that of a file of the standard AV multiplex format, the body of the video file includes video data placed collectively therein. Also the audio file, which is a file of audio data, has a header and a footer of the form same as that of a file of the standard AV multiplex format. However, the body of the audio file has audio data placed collectively therein.

Accordingly, if a video file or an audio file of the AV independent format is transmitted from the disk apparatus 1 to the AV apparatus 5 or 6, the AV apparatus 5 or 6 cannot handle video data or audio data placed in the body of the video file or the audio file of the AV independent format unless the apparatus is ready for the AV independent format. However, the AV apparatus 5 or 6 can handle the video file or the audio file itself of the AV independent format. In particular, the video file or the audio file of the AV independent format is formed from a header, a body, and a footer similarly as in a file of the standard AV multiplex format, and the head and the footer have a form same as that of a file of the standard AV multiplex format. Therefore, unless the "contents" of the body (the data placed in the body) are referred to, the video file or the audio file itself of the AV independent format is equivalent to a file of the standard AV multiplex format (that is, conforms to the standard AV multiplex format). Accordingly, even if the AV apparatus 5 or 6, which is a standard apparatus, is not ready for the AV independent format, it can handle the video file or the audio file itself of the AV independent format.

In other words, the disk apparatus 1 and the AV apparatus 5 or 6, which is a standard apparatus, can perform file exchange of a file of the AV independent format.

As described above, a file of the AV independent format is equivalent to a file of the standard AV multiplex format unless the "contents" of the body of the file are referred to. From this point of view, it can be considered that a file of the AV independent format is compatible with a file of the standard AV multiplex format.

An optical disk 7 can be removably loaded into a disk apparatus 2. The disk apparatus 2 is a standard apparatus similarly to, for example, the AV apparatus 5 and 6, and reads out a video file or an audio file of the AV independent format from an optical disk 7 loaded therein and supplies the thus read out file to an editing apparatus 3.

Again, a video file or an audio file of the AV independent format is equivalent to a file of the standard AV multiplex format unless the "contents" of the body of the file are referred to as described hereinabove. Therefore, the disk apparatus 2, which is a standard apparatus, can read out a video file or an audio file of the AV independent format from the optical disk 7.

The editing apparatus 3 is an apparatus that is ready for the AV independent format and can handle a file of the AV independent format. The editing apparatus 3 performs, for example, AV independent editing of a video file or an audio file of the AV independent format supplied thereto from the disk apparatus 2 and supplies a video file or an audio file of the AV independent format as a result of the editing to the disk apparatus 2.

The disk apparatus 2 records a video file or an audio file of the AV independent format supplied thereto from the editing apparatus 3 onto an optical disk 7 loaded therein.

Once again, a video file or an audio file of the AV independent format is equivalent to a file of the standard AV multiplex format unless the "contents" of the body of the file are referred to as described hereinabove. Therefore, the disk apparatus 2, which is a standard apparatus, can record a video file or an audio file of the AV independent format onto the optical disk 7.

As described hereinabove, in a file of the standard AV multiplex format, video data and audio data are placed in a multiplexed state, for example, in a unit of a frame in the body. Meanwhile, in a video file or an audio file of the AV independent format, video data or audio data are placed collectively in the body. Therefore, editing such as AV independent editing of a video file or an audio file of the AV independent format can be performed readily. Further, since a file of the AV independent format has a header and a footer of the same form as that of a file of the standard AV multiplex format, it is compatible with a file of the standard AV multiplex format unless the "contents" of the body are referred to. Consequently, a file of the AV independent format can be handled by a standard apparatus.

Figure 2:
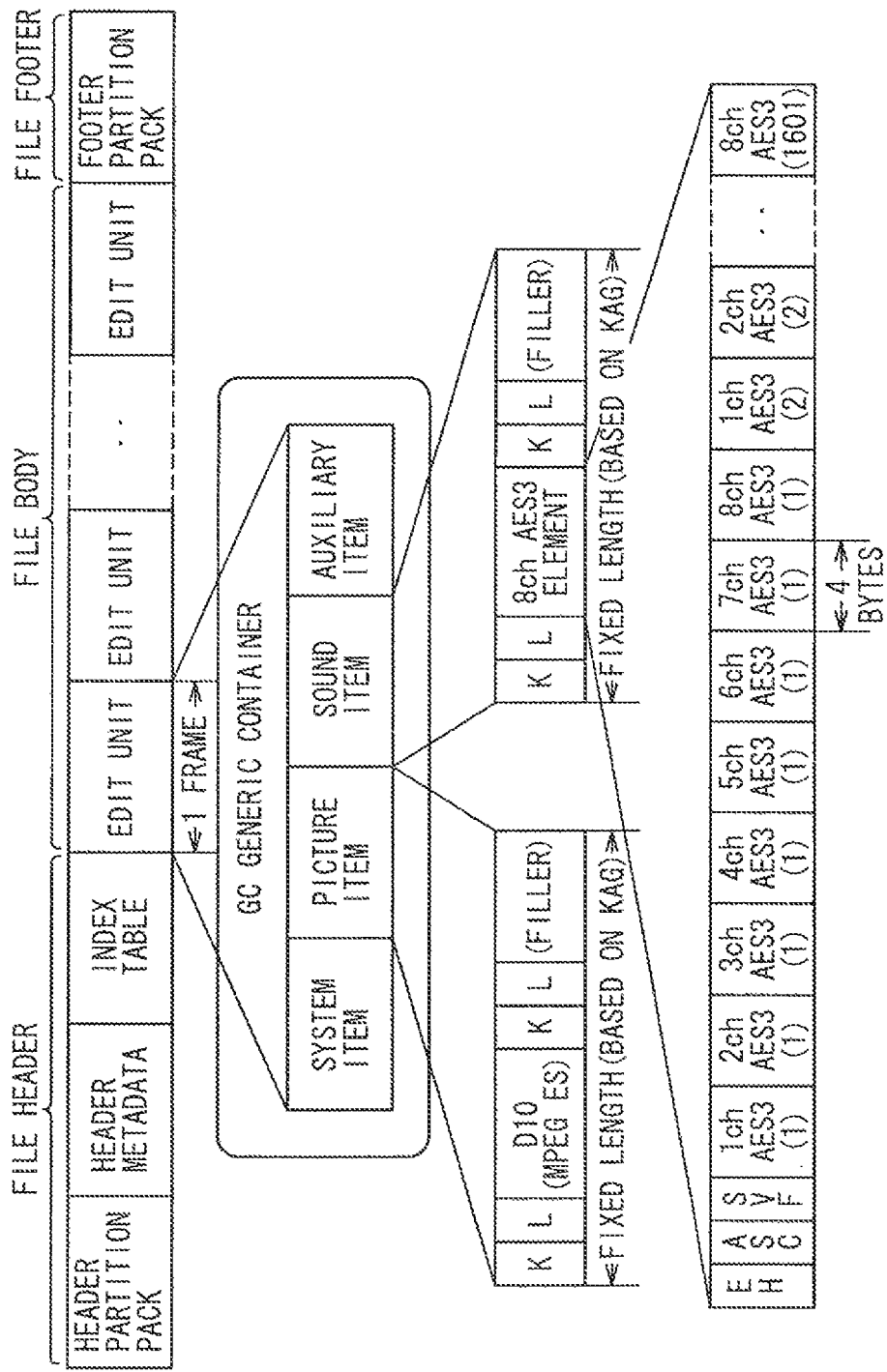
FIG. 2 is a diagrammatic view illustrating a standard AV multiplex format.

FIG. 2 shows an example of the standard AV multiplex format.

More particularly, FIG. 2 illustrates a standard AV multiplex format, which adopts video data coded in accordance with the Moving Picture Experts Group (MPEG) IMX method called. D10 as video data placed in the body. Further, the standard AV multiplex format illustrated adopts non-compressed audio data of the Audio Engineering Society (AES) 3 form as audio data placed in the body.

It is to be noted that other video data and audio data of various formats such as a format of the Digital Video (DV) standards can be placed in the body alternatively.

A file of the standard AV multiplex format is formed from a header (File Header), a body (File Body), and a footer (File Footer) placed in order from the top therein.

The header includes a Header Partition Pack, Header Metadata and an Index Table placed in order from the top therein. The head partition pack includes data for specifying the header, the form of data placed in the body, information representative of a file format, and so forth placed therein. The header metadata includes metadata of a file unit placed therein. The metadata includes, for example, a preparation date of the file, and information regarding data placed in the body. The index table includes a table placed therein. The table indicates the positions of edit units hereinafter described, which are placed in the body.

It is to be noted that the index table is provided optionally and may be or may not be included in the header. Further, the header can place various optional data therein in addition to the index table.

Meanwhile, as the information representative of the file format placed in the header partition pack, information representative of the standard AV multiplex format is adopted in a file of the standard AV multiplex format. However, information representative of the AV independent format is adopted by a file of the AV independent format. It is to be noted that the form itself of the header partition pack is common between the standard AV multiplex format and the AV independent format.

The footer is formed from a Footer Partition Pack in which data for specifying the footer and so forth are placed.

The body is formed from more than one edit unit. An edit unit is a unit of a frame and includes AV data for one frame placed therein.

In particular, an edit unit includes a system item, a picture item, a sound item, and an auxiliary item placed in order from the top therein.

The system item includes metadata (metadata of a frame unit) regarding a frame of video data placed in the succeeding picture item. The metadata of a frame unit may be, for example, a time code.

The picture item includes video data for one frame placed therein. In FIG. 2, video data of the D10 format described hereinabove are placed in the picture item.

In particular, video data for one frame having a Key, Length, and Value (KLV) structure is planed in the picture item by KLV-coding.

The KLV structure signifies a structure wherein a Key, a Length, and a Value are placed in order from the top. The key has a label of 16 bytes placed therein. The label conforms to the standards of the SMPTE 298M and represents what data are placed in the value. The length has placed therein a data length of data placed in the Value. The value here includes video data of one frame placed therein.

The picture item uses a fixed data length whose reference is a KLV Alignment Grid (KAG). In order that the picture item may have a fixed length, also a Filler as data for stuffing is provided with a KLV structure similarly and placed next to the video data of the picture item.

It is to be noted that the fixed length, which is a data length of the picture item and for which the KAG is used as a reference, is set to an integral number of times the sector length of the optical disk 7 such as, for example, 512 bytes or 2 Kbytes. In this instance, the optical disk 7 and the picture item exhibit high affinity, and consequently, reading/writing processing from/to the optical disk 7 can be performed at a high speed.

Not only the system item described above but also a sound item and an auxiliary item hereinafter described adopt the KLV structure similarly to the picture item, and the data length is a fixed length whose reference is the KAG.

The sound item includes audio data placed in a KLV structure placed therein similarly as in the picture item described above. The audio data in this instance corresponds to ode frame of the video data placed in the picture item.

Further, the sound item has audio data of a plurality of channels, for example, eight channels placed in a multiplexed state therein.

In particular, the Value of the KLV structure of the sound item includes an element header EH, an audio sample Count ASC, a stream valid flag SVF, and multiplexed audio data of eight channels placed in order from the top, therein.

In the sound item, the audio data of eight channels are multiplexed by placing samples of the audio data in such an order as first samples, second samples, . . . of the audio data of the eight channels in one frame. Each of numerals in parentheses of the audio data displayed at the lowest portion of FIG. 2 represents what numbered one the sample of the audio data is.

The element header EH has placed therein data for specifying an element header and so forth. The audio sample count ASC has placed therein the number of samples of the audio data placed in the sound item. The stream valid flag SVF is formed from eight bits (one byte), and each bit thereof represents whether the audio data of the channel corresponding to the bit is valid or invalid. In particular, each of the bits of the stream valid flag SVF typically has the value of one where the audio data of the channel corresponding to the bit is valid, but has the value of zero where the audio data is invalid.

The auxiliary item has necessary user data placed therein. Accordingly, the auxiliary item is an area into which the user can place arbitrary data.

As described above, in the standard AV multiplex format, the system item in which metadata of the frame unit is placed, the picture item in which video data is placed, the sound item in which audio data are placed, and the auxiliary item in which user data are placed are multiplexed in a unit of one frame. Further, in the sound item, audio data of eight channels are multiplexed in the unit of one sample.

Where a file in which video data and audio data are placed collectively but separately is used, reproduction of the video data and the audio data cannot be started until after all of the file of the video data and the file of the audio data collected in this manner are received. However, where the standard AV multiplex format is used, since video data and audio data are multiplexed in a unit of a frame, if video data and audio data for one frame are received, then the video data and the audio data of the frame can be reproduced immediately. Accordingly, it is considered that the standard AV multiplex, format is suitable for streaming.

As described above, the standard AV multiplex format is suitable for streaming because video data and audio-data are multiplexed in a unit of a frame. However, the standard AV multiplex format is not suitable for AV independent editing wherein video data and audio data are edited independently of each other.

Further, also metadata of a file unit exist discretely in the system item of the edit unit. The metadata discrete in the system are hard to handle.

Further, the AES3 form, which can be adopted by the standard AV multiplex format, is specified such that at least four bytes are allocated to one sample of audio data. Therefore, the entire file has a great size.

Figure 3:
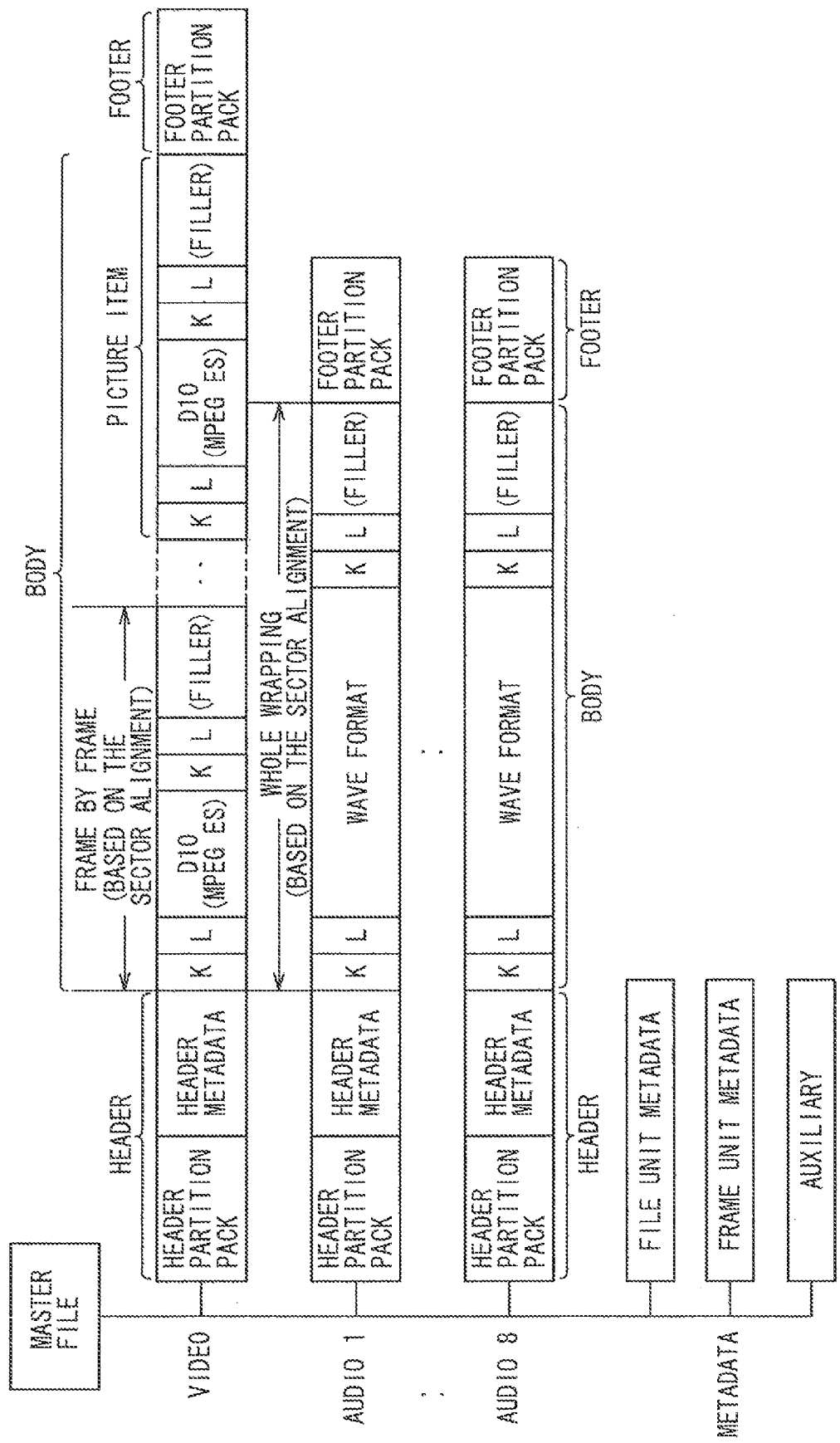
FIG. 3 is a diagrammatic view illustrating an AV independent format.

FIG. 3 illustrates an example of an AV independent format.

Referring to FIG. 3, in the AV independent format illustrated, video data, audio data, metadata in a file unit, and user data, which are multiplexed in the standard AV multiplex format, are formed as files in which they are individually placed collectively.

In particular, in the AV independent format, picture items in which video data are placed in the standard AV multiplex format are placed collectively in the body, and a header and a footer having the same form as that of the standard AV multiplex format are added to the body to form a video file.

It is to be noted that, since the body of a video file of the AV independent format has placed therein picture items each having a length equal to an integral number of times the sector length of the optical disk 7, also the entire body has a size equal to an integral number of times the sector length of the optical disk 7. In other words, the body of a video file of the AV independent format has a size, which exhibits sector alignment.

Further, while the index table shown in FIG. 2 is shown in the header of the file of the standard AV multiplex format, according to the MXF, the index table is optional. Thus, the video file shown in FIG. 3 does not adopt the index table. This similarly applies to audio files hereinafter described.

In the AV independent format, multiplexed audio data of eight channels placed in the sound items in the standard AV multiplex format are demultiplexed in audio data for the individual channels. Thus, audio data whose form has been converted from the AES3 format into the WAVE form are placed in the KLV structure in the body of a file of each channel. A header and a footer of the form same as that of the standard AV multiplex format are added to the body to form an audio file.

In particular, in the AV independent format, audio files for eight channels are formed independently of each other for audio data of the eight channels. An audio file for each channel is formed by processing the audio data of the channel so as to have the WAVE form and the KLV structure, placing the processed audio data collectively into the body, and then adding a header and a footer of the form same as that of the standard AV multiplex format to the body.

It is to be noted that, while the body of an audio file of the AV independent format has placed therein audio data of the WAVE form of a certain channel collected so as to have the KLV structure as described above, the entire audio data may not necessarily have a size equal to a plural number of times the sector length of the optical disk 7. Therefore, in order to establish sector alignment, a filler of the KLV structure necessary to establish sector alignment is placed next to the audio data of the KLV structure in the body of an audio file of the AV independent format.

The AV independent format includes the following files in addition to such a video file and audio files individually for eight channels as described above. In particular, the AV independent format further includes a metadata file of file units in which metadata of file units placed in the head metadata in the standard AV multiplex format are placed collectively. The AV independent format further includes a metadata file of frame units in which system items in which metadata of frame units are placed in the standard AV multiplex format are placed collectively. Furthermore, the AV independent format includes an auxiliary file wherein auxiliary items in which user data are placed in the standard AV multiplex format are placed collectively.

In addition, the AV independent format includes a master file in which pointers to a video file, audio files individual for eight channels, a metadata file of file units, a metadata file of frame units and an auxiliary file are described.

More particularly, the master file is described, for example, in the Extensible Markup Language (XML). In the master file, for example, file names of a video file, audio files individual for eight channels, a metadata file of file units, a metadata file of frame units, and an auxiliary file are described as pointers to the files.

Accordingly, the video file, audio files individual for eight channels, metadata file of file units, metadata file of frame units, and auxiliary file can be referred to from the master file.

It is to be noted that, for example, the auxiliary file may be an optional file.

It is to be noted that the metadata file of file units, metadata file of frame units and the auxiliary file illustrated in FIG. 3 do not have a header and a footer of the form same as that of the standard AV multiplex format. However, a header and a footer of the form same as that of the standard AV multiplex format may otherwise be added to the metadata file of file units, metadata file of frame units, and the auxiliary file.

Further, the header metadata, which forms the header of a video file and a header file of the AV independent format, has metadata of file units of a minimum set placed therein.

In particular, the AV independent format includes metadata files of file units wherein metadata of file units placed in the header metadata are placed in the standard AV multiplex format. Therefore, it is redundant to place the metadata of file units placed in the metadata files in an overlapping relationship with the header metadata, which form the header of the video file and audio files. Further, this makes the size of the entire file of the AV independent format great.

However, in the MXF, the header metadata is an item essentially required for the header, and if a header is formed without placing header metadata therein, then the resulting header does not have the same form as that of the standard AV multiplex format.

Meanwhile, in the MXF, metadata of file units to be placed in the header metadata includes various items. However, some of the items are essentially required, but the other items are optional.

Therefore, in order to prevent the file size from becoming great and maintain the compatibility with the standard AV multiplex format, the header metadata, which form the header of the video file and the audio files of the AV independent format, has metadata of file units of a minimum set placed therein. More particularly, metadata only of those items whose placement in the header metadata is essentially required in the MXF are placed in the header metadata of the video file and the audio files of the AV independent format.

As described above, in the AV independent format, video data are placed collectively in the video file, and audio data of individual channels are collectively placed in the audio files for the individual channels. Therefore, editing such as AV independent editing wherein video data and audio data are edited independently of each other can be performed readily.

Furthermore, in the AV independent format, since audio data have the WAVE format, the data amount can be reduced when compared with an alternative case wherein audio data of the AES3 form are adopted as in the standard AV independent format. As a result, when a file of the AV independent format is recorded onto a storage such as the optical disk 7, the capacity of the storage necessary for the recording can be reduced when compared with an alternative case wherein a file of the standard AV multiplex format is recorded.

Further, a video file and audio files of the AV independent format include a header, a body, and a footer disposed in order from the top similarly to a file of the standard AV multiplex format, and the header and the footer are placed in a form same as that of the standard AV multiplex form. Therefore, if a video file and audio files of the AV independent format are recorded onto a removable optical disk 7 by the disk apparatus 1 and the optical disk 7 is loaded into the disk apparatus 2, then if the disk apparatus 2 is a standard apparatus (on which a file of the MXF can be handled), then the apparatus 2 can read out the video file and the audio files of the AV independent format from the optical disk 7.

Further, in the AV independent format, metadata of file units and metadata of frame units are collected separately each into different files. This facilitates a search process in which metadata is used.

Figure 4:
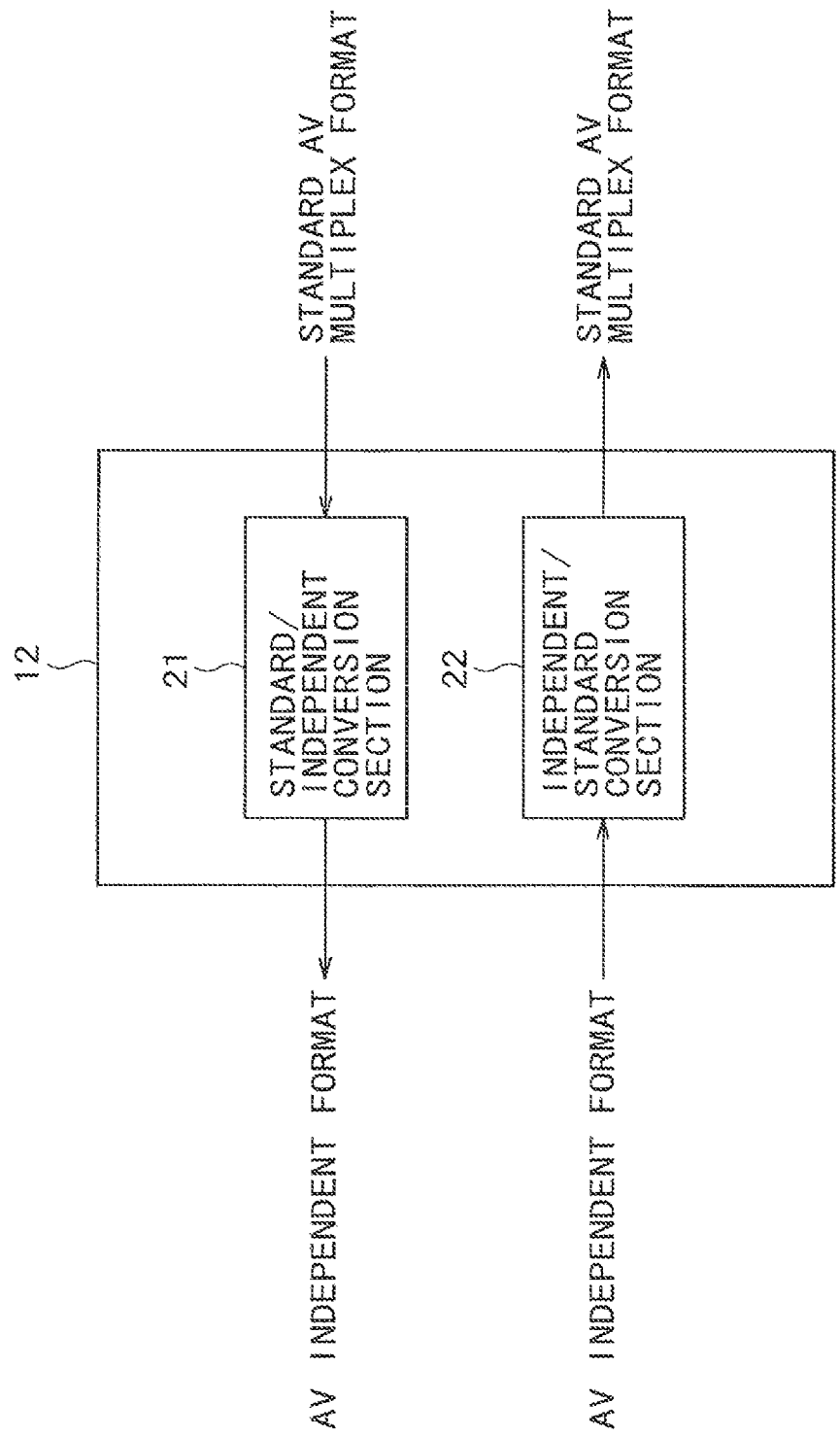
FIG. 4 is a block diagram showing an example of a configuration of a format conversion section shown in FIG. 1.

FIG. 4 shows an example of a configuration of the format conversion section 12 of the disk apparatus 1 of FIG. 1.

Referring to FIG. 4, the format conversion section 12 shown includes a standard/independent conversion section 21 and an independent/standard conversion section 22.

The standard/independent conversion section 21 converts a file of the standard AV multiplex format of FIG. 2 supplied thereto from the communication interface 13 into a file of the AV independent format of FIG. 3 and supplies the resulting file to the disk driving section 11. The independent/standard conversion section 22 converts a file of the AV independent format of FIG. 3 supplied thereto from the disk driving section 11 into a file of the standard AV multiplex format of FIG. 2 and supplies the resulting file to the communication interface 13.

Figure 5:
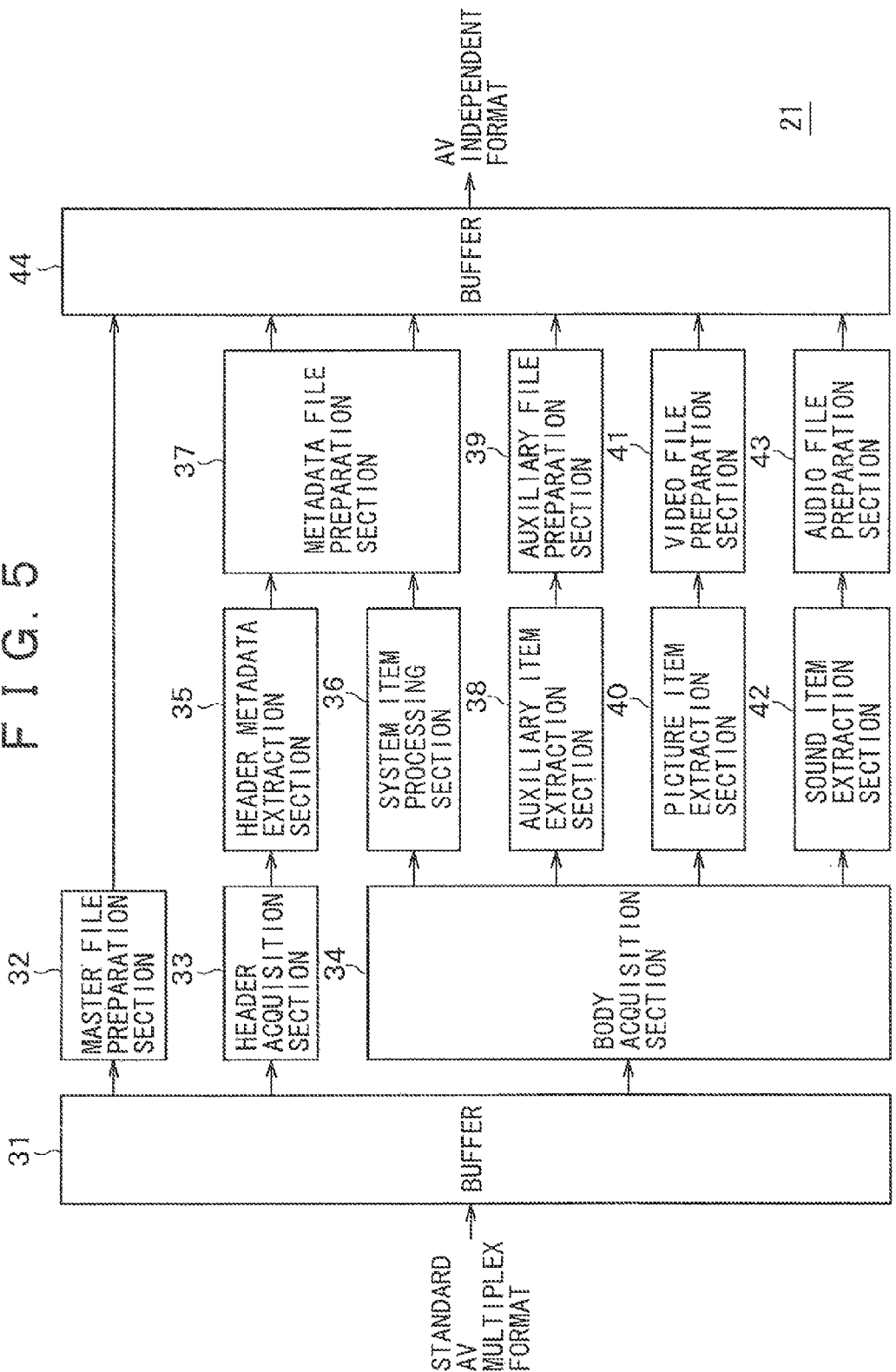
FIG. 5 is a block diagram showing an example of a configuration of a standard/independent conversion section shown in FIG. 4.

FIG. 5 shows an example of a configuration of the standard/independent conversion section 21 shown in FIG. 4.

Referring to FIG. 5, a file of the standard AV multiplex format is supplied from the communication interface 13 to a buffer 31. The buffer 31 temporarily stores the file of the standard AV multiplex format supplied thereto.

After the file of the standard AV multiplex format is stored into the buffer 31, a master file preparation section 32 prepares a master file of the AV independent format from the file of the standard AV multiplex format and supplies the prepared file to a buffer 44.

A header acquisition section 33 extracts a header from the file of the standard AV multiplex format stored in the buffer 31 to acquire the header and supplies the header to a header metadata extraction section 35.

A body acquisition section 34 extracts a body from the file of the standard AV multiplex format stored in the buffer 31 to acquire the body and supplies the body to a system item extraction section 36, an auxiliary item extraction section 38, a picture item extraction section 40, and a sound item extraction section 42.

The header metadata extraction section 35 extracts header metadata from the header supplied thereto from the header acquisition section 33 and supplies metadata of file units placed in the header metadata to a metadata file preparation section 37. The system item extraction section 36 extracts system items in which the metadata of frames are placed from edit units of the body supplied thereto from the body acquisition section 34 and supplies the system items to the metadata file preparation section 37. The metadata file preparation section 37 prepares a metadata file of file units in which the metadata of file units supplied thereto from the header metadata extraction section 35 are placed. The metadata file preparation section 37 further prepares a metadata file of frame units in which the system items of the edit units supplied thereto from the system item extraction section 36 are collectively and sequentially placed. The metadata file preparation section 37 supplies the metadata files of file units and frame units to the buffer 44.

The auxiliary item extraction section 38 extracts auxiliary items in which user data of frame units are placed from the edit units of the body supplied thereto from the body acquisition section 34 and supplies, the extracted auxiliary items to an auxiliary file preparation section 39. The auxiliary file preparation section 39 prepares an auxiliary file in which the auxiliary items of the edit units supplied thereto from the auxiliary file preparation section 39 are collectively placed and supplies the auxiliary file to the buffer 44.

The picture item extraction section 40 extracts picture items in which video data of frame units are placed from the edit units of the body supplied thereto from the body acquisition section 34 and supplies the picture items to a video file preparation section 41. The video file preparation section 41 prepares a file in which the picture items of the edit units supplied thereto from the picture item extraction section 40 are placed collectively in the body and a header and a footer of a form same as that of a file of the standard AV multiplex format are added to the body. The video file preparation section 41 supplies the thus prepared file to the buffer 44.

The sound item extraction section 42 extracts sound items in which audio data of frame units are placed from the edit units of the body supplied thereto from the body acquisition section 34 and supplies the sound item to an audio file preparation section 43. The audio file preparation section 43 prepares an audio file for each channel in which audio data of the channel placed in the sound items of the edit units supplied thereto from the sound item extraction section 42 are placed collectively for the channel in the body and a header and a footer of a form same as that of a file of the standard AV multiplex format are added to the body. The audio file preparation section 43 supplies the audio files for the channels prepared in this manner to the buffer 44.

The buffer 44 temporarily stores the master file supplied thereto from the master file preparation section 32, the metadata files of file units and frame units supplied thereto from the metadata file preparation section 37, and the auxiliary file supplied thereto from the auxiliary file preparation section 39. Further, the buffer 44 temporarily stores the video file supplied thereto from the video file preparation section 41 and the audio files for the channels supplied thereto from the audio file preparation section 43. Then, the buffer 44 supplies the stored files as files of the AV independent format to the disk driving section 11.

Figure 6:
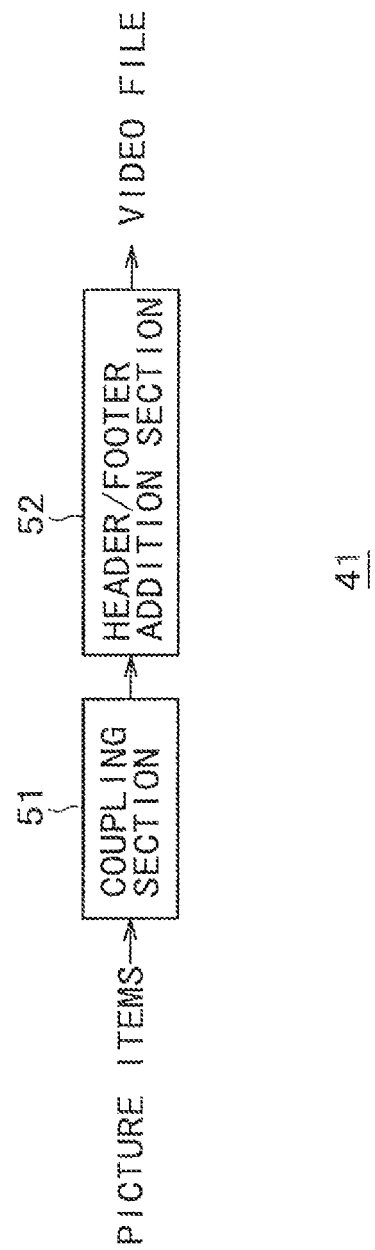
FIG. 6 is a block diagram showing an example of a configuration of a video file preparation section shown in FIG. 5.

FIG. 6 shows an example of a configuration of the video file preparation section 41 shown in FIG. 5.

Referring to FIG. 6, a picture item of each edit unit supplied from the picture item extraction section 40 is received by a coupling section 51. The coupling section 51 successively couples or connects picture items of edit units successively supplied thereto and supplies the picture items to a header/footer addition section 52. The header/footer addition section 52 adds a header and a footer of a form same as that of a file of the standard AV multiplex format to a body provided by the picture items of the edit units coupled to each other and supplied thereto from the coupling section 51 to form a video file of the AV independent format. Then, the header/footer addition section 52 outputs the video file of the AV independent format.

Figure 7:
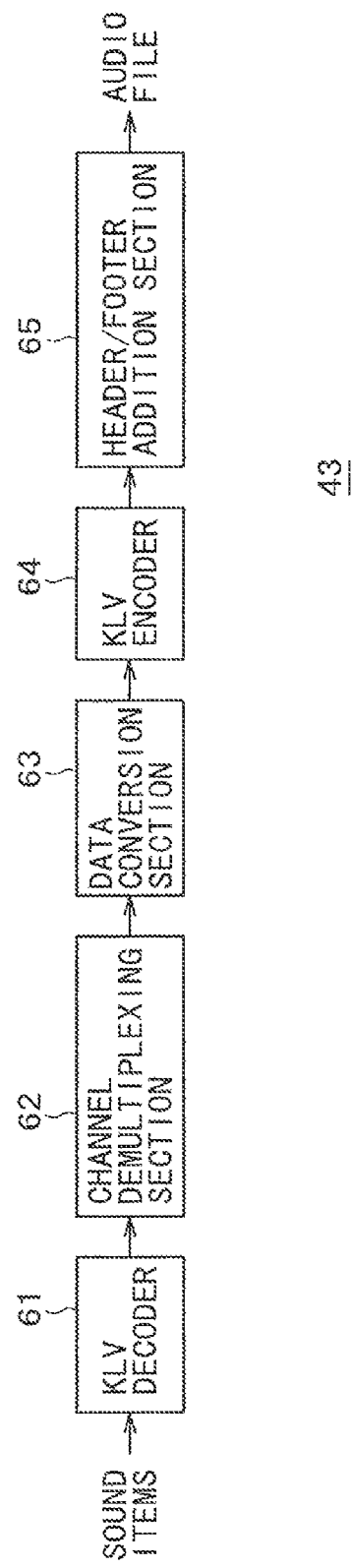
FIG. 7 is a block diagram showing an example of a configuration of an audio file preparation section shown in FIG. 5.

FIG. 7 shows an example of a configuration of the audio file preparation section 43 shown in FIG. 5.

Referring to FIG. 7, a sound item of each edit unit supplied from the sound item extraction section 42 is received by a KLV decoder 61. The KLV decoder 61 decomposes the KLV structure of audio data placed in the sound items of the edit units to obtain multiplexed audio data of eight channels (such data is hereinafter referred to suitably as multiplexed audio data) and supplies the multiplexed audio data to a channel demultiplexing section 62.

The channel demultiplexing section 62 demultiplexes the multiplexed audio data of sound items supplied thereto from the KLV decoder 61 into audio data of individual channels and supplies the audio data of the channels collectively for the individual channels to a data conversion section 63.

The data conversion section 63 converts the coding method of the audio data of the channels supplied thereto from the channel demultiplexing section 62. In particular, while audio data in the standard AV multiplex format are in a form encoded by the AES3 form, the audio data in the AV independent format are in another form encoded by the WAVE system. Therefore, the data conversion section 63 converts the audio data (audio data of the AES3 form) encoded by the AES3 method into audio data (audio data of the WAVE system) encoded by the WAVE system.

It is to be noted that, while the data conversion section 63 here converts audio data of the AES3 system into audio data of the WAVE system, the section 63 can convert the audio data into audio data of a system other than the WAVE system. In particular, the conversion of audio data by the data conversion section 63 is performed for the object of suppressing the data amount of audio data of the AES3 system. Therefore, the data conversion section 63 may adopt any coding system only if the coding system can achieve the object just described.

On the other hand, where the data amount of audio data does not matter, the audio file preparation section 43 can be configured without provision of the data conversion section 63.

The audio data of the individual channels of the WAVE system obtained by the data conversion section 63 are supplied to a KLV encoder 64. The KLV encoder 64 KLV-encodes the audio data supplied thereto from the data conversion section 63 and collected for the individual channels into audio data of the KLV structure. Then, the KLV encoder 64 adds a filler (FIG. 3) necessary for establishment of sector alignment to the audio data of each channel of the KLV structure and supplies the resulting audio data of the channels to a header/footer addition section 65.

The header/footer addition section 65 adds a header and a footer of a form same as that of a file of the standard AV multiplex format to the body of each channel, which includes the audio data of the channel supplied thereto from the KLV encoder 64, to produce an audio file for each channel of the AV independent format. Then, the header/footer addition section 65 outputs the audio files of the individual channels of the AV independent format.

Referring back to FIG. 5, the standard/independent conversion section 21 performs a master file preparation process for preparing a master file as a file of the AV independent format, a metadata file preparation process for preparing metadata files of file units and frame units, and an auxiliary file preparation process for preparing an auxiliary file. The standard/independent conversion section 21 further performs a video file preparation process for preparing a video file and an audio file preparation process for preparing audio files.

Thus, the master file preparation process, metadata file preparation process, auxiliary file preparation process, video file preparation process, and audio file preparation process executed by the standard/independent conversion section 21 are described below with reference to flow charts of FIGS. 8 to 13.

Figure 8:
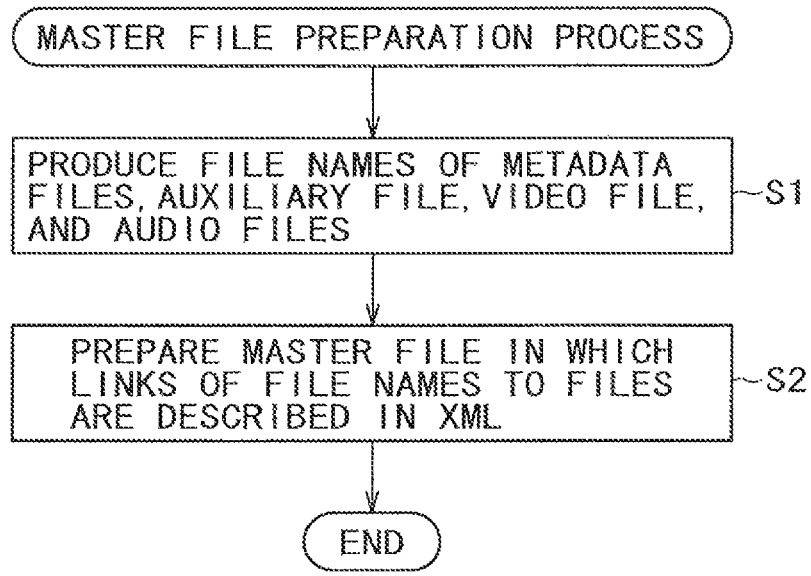
FIG. 8 is a flow chart illustrating a master file preparation process executed by the standard/independent conversion section of FIG. 5.

First, the master file preparation process is described with reference to the flow chart of FIG. 8.

The master file preparation is started, for example, when a file of the standard AV multiplex format is supplied to and stored into the buffer 31 (FIG. 5). Thus, first at step S1, the master file preparation section 32 (FIG. 5) produces file names for metadata files of file units and frame units, an auxiliary file, a video file, and audio files for individual channels. Then, the processing advances to step S2. At step S2, the master file preparation section 32 prepares a master file in which a link to a file of each of the file names produced at step S1 is described in the XML and supplies the master file to the buffer 44 so that the master file is stored into the buffer 44. The master file preparation process is ended thereby.

Figure 9:
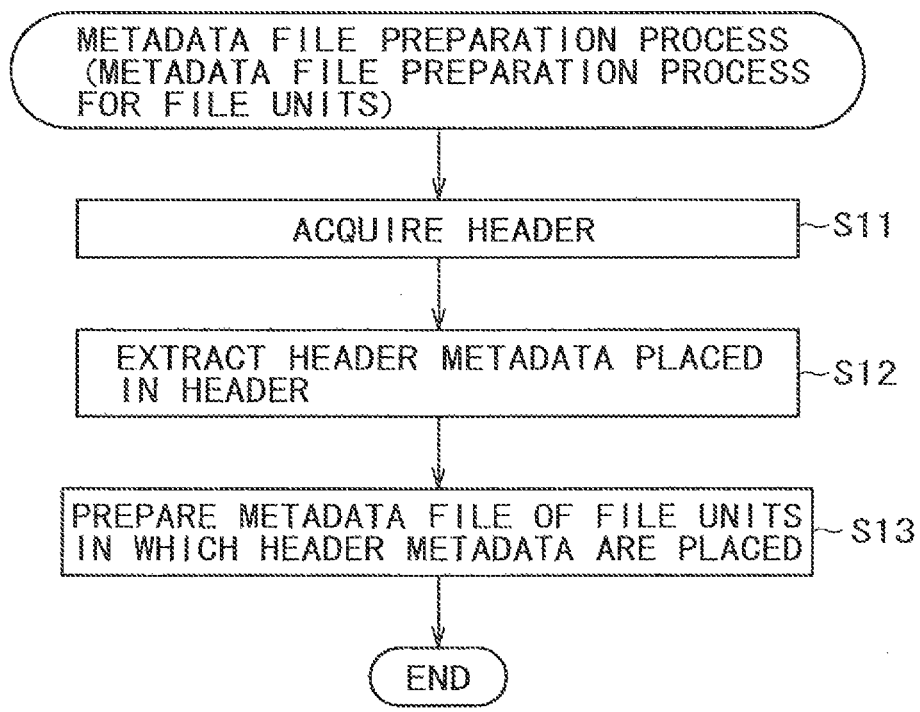
FIG. 9 is a flow chart illustrating a metadata file preparation process for a file unit executed by the standard/independent conversion section of FIG. 5.

Now, the metadata file preparation process for file units for preparing a metadata file of file units is described with reference to the flow chart of FIG. 9.

For example, if a file of the standard AV multiplex format is supplied to and stored into the buffer 31 (FIG. 5), then the metadata file preparation process for file units is started. First at step S11, the header acquisition section 33 acquires the header from the file of the standard AV format stored in the buffer 31 and supplies the header to the header metadata extraction section 35. Then, the processing advances to step S12. At step. S12, the header metadata extraction section 35 extracts header metadata from the header supplied thereto from the header acquisition section 33 and supplies the header metadata of file units placed in the header metadata to the metadata file preparation section 37. Then, the processing advances to step S13. At step S13, the metadata file preparation section 37 prepares a metadata file of file units in which the metadata of file units supplied thereto from the header metadata extraction section 35 are placed, and supplies the metadata file of file units to the buffer 44 so that the metadata file of file units may be stored into the buffer 44. The metadata preparation process for file units is ended thereby.

Figure 10:
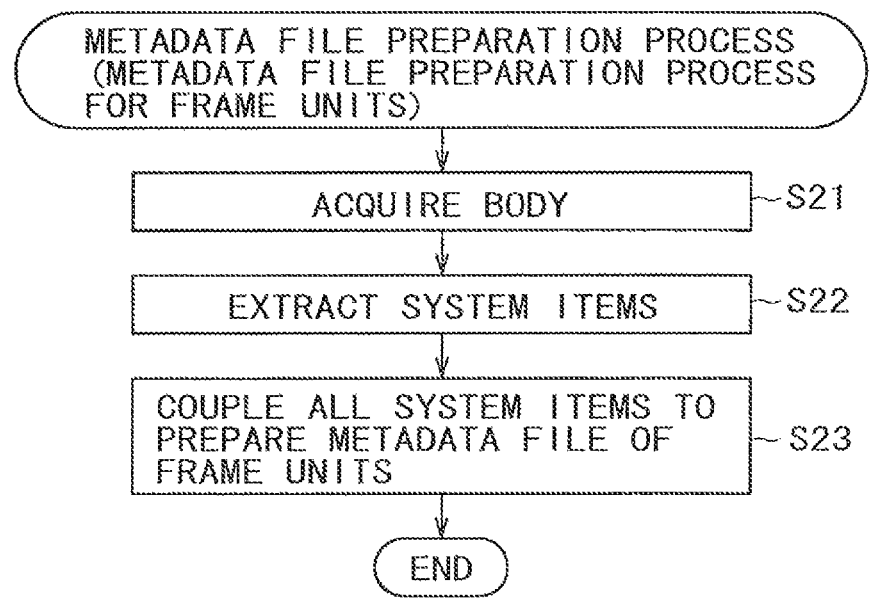
FIG. 10 is a flow chart illustrating a metadata file preparation process for a frame unit executed by the standard/independent conversion section of FIG. 5.

Now, the metadata file preparation process for frame units wherein a metadata file of frame units is prepared is described with reference to the flow chart of FIG. 10.

For example, if a file of the standard AV multiplex format is stored into the buffer 31 (FIG. 5), then the metadata file preparation process for frame units is started. First at step S21, the body acquisition section 34 acquires the body from the file of the standard AV multiplex format stored in the buffer 31 and supplies the body to the system item extraction section 36. Then, the processing advances to step S22. At step S22, the system item extraction section 36 extracts system items in which metadata of frame units are placed from edit units of the body supplied thereto from the body acquisition section 34 and supplies the system items to the metadata file preparation section 37. Then, the processing advances to step S23. At step S23, the metadata file preparation section 37 couples the system items of the edit units supplied from the system item extraction section 36 to prepare a metadata file of frame units in which the system items of the edit units are collectively placed. Then, the metadata file preparation section 37 supplies the metadata file of frame units to the buffer 44 so that the metadata file of frame units is stored into the buffer 44. The metadata file preparation process for a frame unit is ended thereby.

Figure 11:
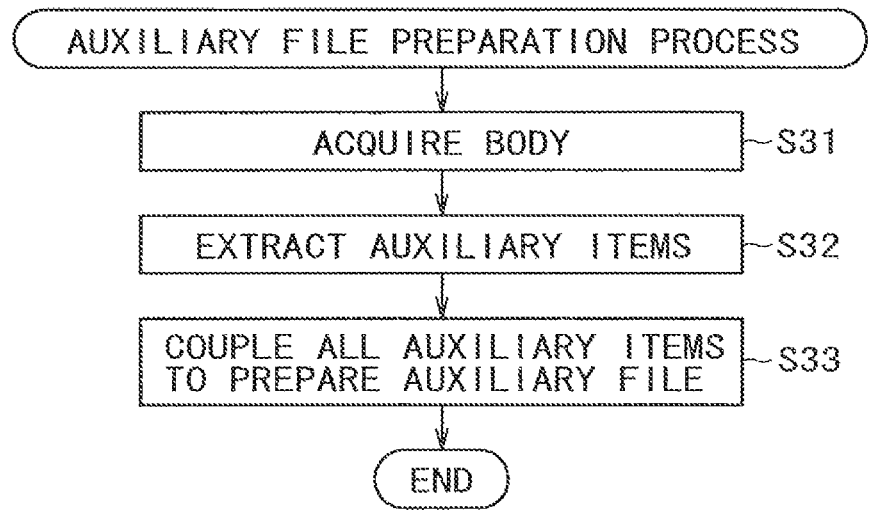
FIG. 11 is a flow chart illustrating an auxiliary file production process executed by the standard/independent conversion section of FIG. 5.

Subsequently, the auxiliary file preparation process for preparing an auxiliary file is described with reference to the flow chart of FIG. 11.

For example, if a file of the standard AV multiplex format is supplied to the buffer 31 (FIG. 5), then the auxiliary file preparation process is stared. First at step S31, the body acquisition section 34 acquires the body from the file of the standard AV multiplex format stored in the buffer 31 and supplies the body to the auxiliary item extraction section 38. Then, the processing advances to step S32. At step S32, the auxiliary item extraction section 38 extracts auxiliary items from edit units of the body supplied thereto from the body acquisition section 34 and supplies the extracted auxiliary items to the auxiliary file preparation section 39. Then, the processing advances to step S33. At step S33, the auxiliary file preparation section 39 couples the auxiliary items of the edit units supplied thereto from the auxiliary item extraction section 38 to prepare an auxiliary file in which the auxiliary items of the edit units are placed collectively. Then, the auxiliary file preparation section 39 supplies the auxiliary file to the buffer 44 so that the auxiliary file is stored into the buffer 44. The auxiliary file preparation process is ended thereby.

Figure 12:
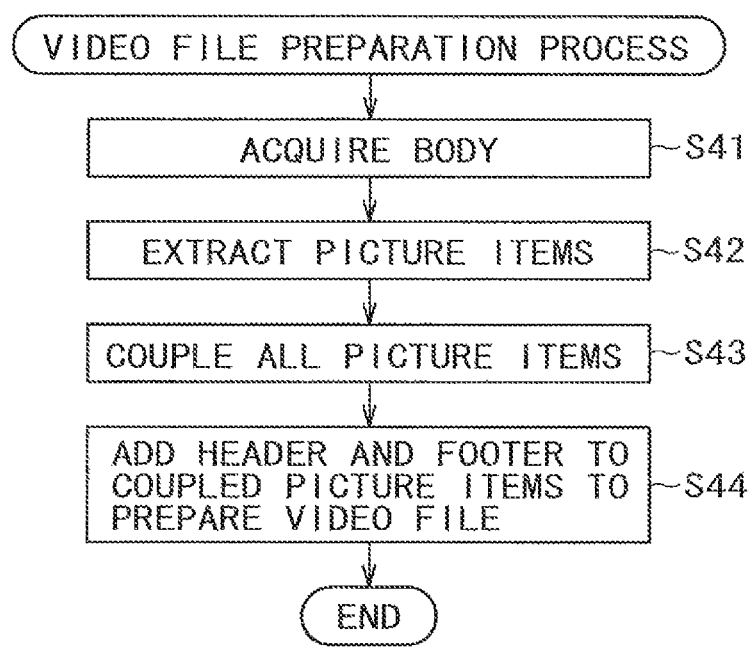
FIG. 12 is a flow chart illustrating a video file preparation process executed by the standard/independent conversion section of FIG. 5.

Now, the video file preparation process for preparing a video file is described with reference to the flow chart of FIG. 12.

For example, if a file of the standard AV multiplex format is supplied to and stored into the buffer 31 (FIG. 5), then the video file preparation process is started. First at step S41, the body acquisition section 34 acquires the body from the file of the standard AV multiplex format stored in the buffer 31 and supplies the body to the picture item extraction section 40. Then, the processing advances to step S42. At step S42, the picture item extraction section 40 extracts picture items from edit units of the body supplied thereto from the body acquisition section 34 and supplies the extracted picture items to the video file preparation section 41. Then, the processing advances to step S43. At step S43, the video file preparation section 41 (FIG. 6) couples the picture items of the edit units supplied thereto from the picture item extraction section 40 to produce a body in which the picture items of the edit units are collectively placed and supplies the produced body to the header/footer addition section 52. Then, the processing advances to step S44.

At step S44, the header/footer addition section 52 adds a header and a footer of a form same as that of the file of the standard AV multiplex format to the body supplied thereto from the coupling section 51 to prepare a video file of the AV independent format. Then, the header/footer addition section 52 supplies the video file of the AV independent format to the buffer 44 so that the video file is stored into the buffer 44. The video file preparation process is ended thereby.

Figure 13:
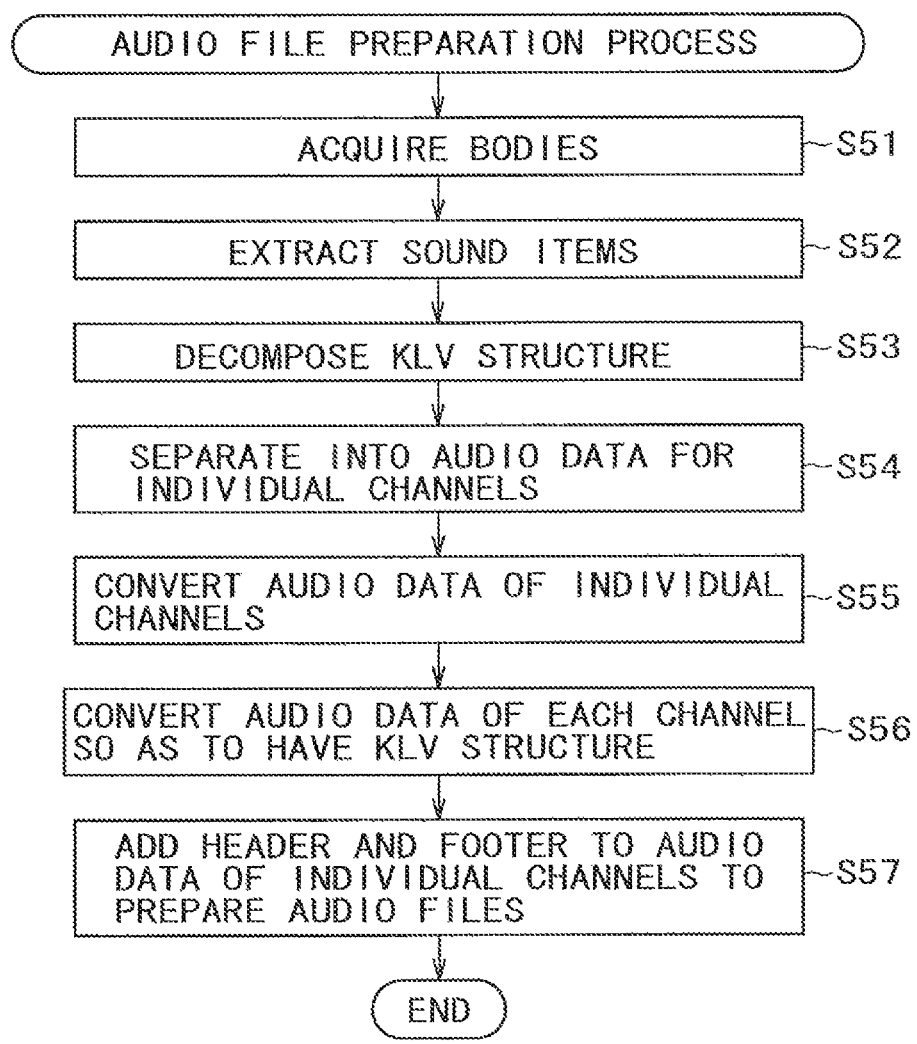
FIG. 13 is a flow chart illustrating an audio file preparation process executed by the standard/independent conversion section of FIG. 5.

Now, the audio file preparation process for preparing audio files is described with reference to the flow chart of FIG. 13.

For example, if a file of the standard AV multiplex format is supplied to and stored into the buffer 31 (FIG. 5), then the audio file preparation process is started. First at step S511, the body acquisition section 34 acquires the body from the file of the standard AV multiplex format stored in the buffer 31 and supplies the body to the sound item extraction section 42. Then, the processing advances to step S52. At step S52, the sound item extraction section 42 extracts sound items from edit units of the body supplied thereto from the body acquisition section 34 and supplies the extracted sound items to the audio file preparation section 43. Then, the processing advances to step S53. At step S53, the audio file preparation section 43 (FIG. 7) decomposes the KLV structure of the audio data placed in the sound items of the edit units to obtain multiplexed audio data of eight channels. Then, the audio file preparation section 43 supplies the multiplexed audio data to the channel demultiplexing section 62. Thereafter, the processing advances to step S54.

At step S54, the channel demultiplexing section 62 demultiplexes the multiplexed audio data of the sound items supplied thereto from the KLV decoder 61 to form audio data of the AES3 form for the individual channels. Then, the channel demultiplexing section 62 collectively places the audio data of the AES3 form for the individual channels and supplies the resulting audio data to the data conversion section 63.

Then, the processing advances to step S55, at which the data conversion section 63 converts the audio data of the AES3 of the individual channels supplied thereto from the channel demultiplexing section 62 into audio data of the WAVE form and supplies the audio data of the WAVE form to the KLV encoder 64. Then, the processing advances to step S56. At step S56, the KLV encoder 64 KLV-encodes the audio data of the WAVE form collected for the individual channels and received from the data conversion section 63 into audio data of the KLV structure. Further, the KLV encoder 64 adds a filler (FIG. 23) necessary to establish sector alignment to the audio data of each of the channels having the KLV structure. Consequently, the KLV encoder 64 produces a body for each channel in which the audio data of the WAVE form of the channel are placed collectively, and besides a required filler is placed. The KLV encoder 64 supplies the thus produced bodies to the header/footer addition section 65. Thereafter, the processing advances to step S57.

At step S57, the header/footer addition section 65 adds a header and a footer of a form same as that of the file of the standard AV multiplex format to the body of each of the channels supplied thereto from the KLV encoder 64 to prepare an audio file of the AV independent format for the channel. Then, the header/footer addition section 65 supplies the audio files of the AV independent format for the individual channels to the buffer 44 so that the audio files are stored into the buffer 44. The audio file preparation process is ended thereby.

Figure 14:
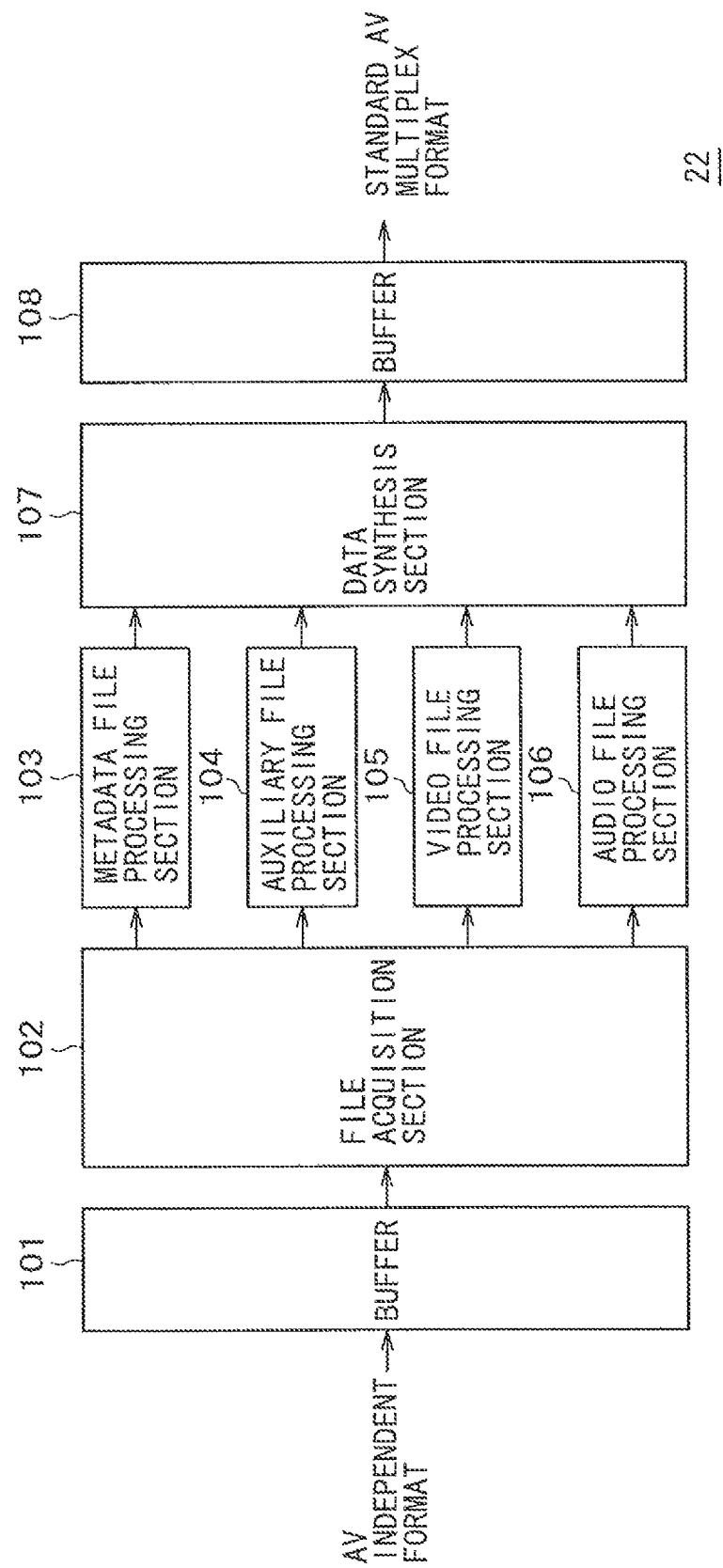
FIG. 14 is a block diagram showing an example of a configuration of an independent/standard conversion section shown in FIG. 4.

FIG. 14 shows an example of a configuration of the independent/standard conversion section 22 of FIG. 4.

Referring to FIG. 14, a buffer 101 temporarily stores files of the AV independent format supplied thereto from the disk driving section 11 (FIG. 1). The files include a master file, a metadata file of file units, a metadata file of frame units, an auxiliary file, a video file, and audio files for eight channels.

A file acquisition section 102 refers to the master file stored in the buffer 101 to recognize the file names of the metadata file of file units, metadata file of frame units, auxiliary file, video file, and audio files for eight channels. Then, the buffer 101 accesses the disk driving section 11 through the buffer 101 to read out the metadata file of file units, metadata file of frame units, auxiliary file, video file, and audio files for eight channels from the optical disk 7 based on the recognized file names to acquire the files. Then, the file acquisition section 102 supplies the metadata file of file units and the metadata file of frame units thus acquired to a metadata file processing section 103. Further, the file acquisition section 102 supplies the auxiliary file to an auxiliary file processing section 104, supplies the video file to a video file processing section 105, and supplies the audio files for eight channels to an audio file processing section 106.

The metadata file processing section 103 extracts metadata of file units from within the metadata file of file units supplied thereto from the file acquisition section 102. Further, the metadata file processing section 103 extracts system items in which the metadata of frame units are placed from within the metadata file of frame units. Then, the metadata file processing section 103 supplies the metadata of file units and the system items to a data synthesis section 107.

The auxiliary file processing section 104 extracts auxiliary items from within the auxiliary file supplied thereto from the file acquisition section 102 and supplies the auxiliary items to the data synthesis section 107.

The video file processing section 105 extracts picture items from within the video file supplied thereto from the file acquisition section 102 and supplies the picture items to the data synthesis section 107.

The video file processing section 105 extracts audio data of the individual channels from within the audio files of the eight channels supplied thereto from the file acquisition section 102 and produces sound items in which the audio data of the individual channels are placed in a multiplexed state. The video file processing section 105 supplies the sound items to the data synthesis section 107.

The data synthesis section 107 receives the metadata of file units and the system items supplied thereto from the metadata file processing section 103, the auxiliary items supplied thereto from the auxiliary file processing section 104, the picture items supplied thereto from the video file processing section 105, and the sound items supplied thereto from the audio file processing section 106. Then, the data synthesis section 107 uses the received items to prepare a file of the standard AV multiplex format and supplies the file of the standard AV multiplex format to a buffer 108.

The buffer 108 temporarily stores the file of the standard AV multiplex format supplied thereto from the data synthesis section 107 and supplies the file to the communication interface 13 (FIG. 1).

Figure 15:
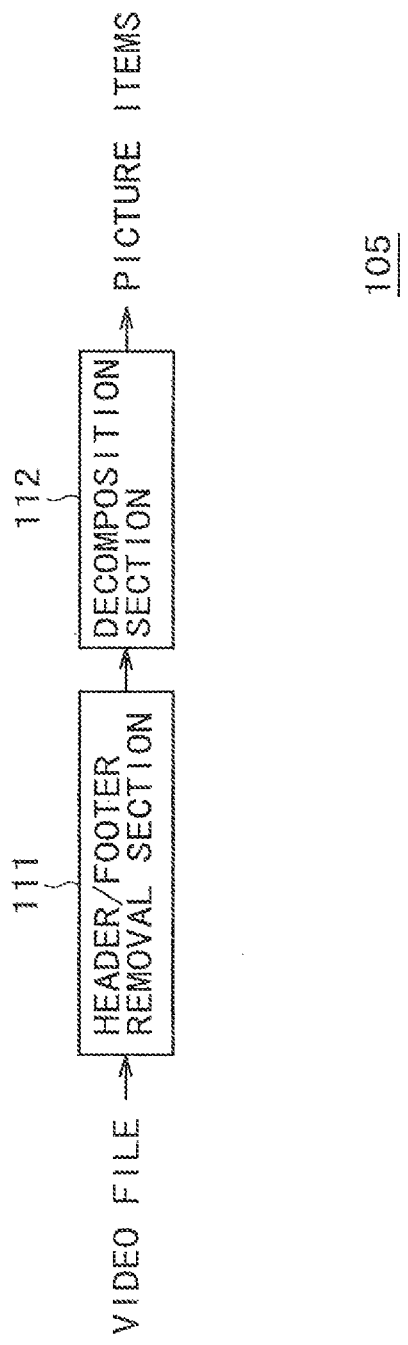
FIG. 15 is a block diagram showing an example of a video file processing section shown in FIG. 14.

FIG. 15 shows an example of a configuration of the video file processing section 105 shown in FIG. 14.

A video file supplied from the file acquisition section 102 is received by a header/footer removal section 111. The header/footer removal section 111 removes a header and a footer from the video file received thereby and supplies the remaining body to a decomposition section 112. The decomposition section 112 separates a sequence of picture items placed in the body supplied thereto from the header/footer removal section 111 and extracts, from within the sequence, units to be multiplexed with other items (system items, sound items, and auxiliary items), that is, the individual items in which video data of frame units are placed. Then, the decomposition section 112 supplies the picture items to the data synthesis section 107 (FIG. 4).

Figure 16:
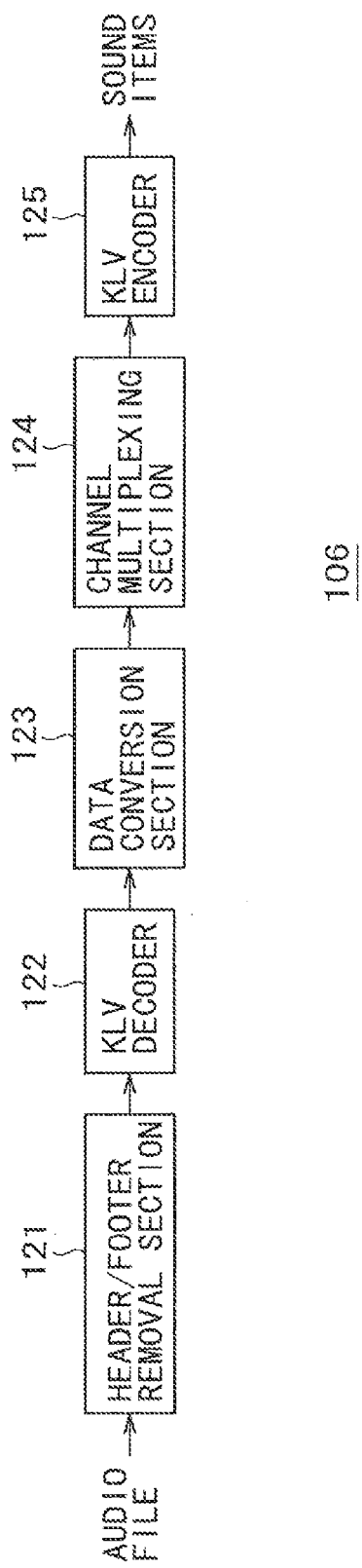
FIG. 16 is a block diagram showing an example of an audio file processing section shown in FIG. 14.

FIG. 16 shows an example of a configuration of the audio file processing section 106 shown in FIG. 14.

Audio files of eight channels supplied from the file acquisition section 102 are received by a header/footer removal section 121. The header/footer removal section 121 removes a header and a footer from each of the audio files of eight channels received thereby and supplies the remaining bodies of the channels to a KLV decoder 122.

The KLV decoder 122 decomposes the KLV structure of the bodies of the channels supplied thereto from the header/footer removal section 121 and supplies the audio data of the WAVE form of the channels obtained by the decomposition to a data conversion section 123.

The data conversion section 123 performs inverse conversion to that executed by the data conversion section 63 of FIG. 7 for the audio data supplied thereto from the KLV decoder 122. In particular, the data conversion section 123 converts the audio data of the channels of the WAVE form supplied thereto from the KLV decoder 122 into audio data of the channels of the AES3 form and supplies the audio data of the channels of the AES3 form to a channel multiplexing section 124.

The channel multiplexing section 124 multiplexes the audio data of the channels supplied thereto from the channel multiplexing section 124 in a unit of a sample and supplies multiplexed audio data obtained by the multiplexing to a KLV encoder 125.

The KLV encoder 125 delimits the multiplexed audio data supplied thereto from the channel multiplexing section 124 in a unit corresponding to each frame of the video data and KLV-encodes the multiplexed audio data corresponding to each frame so as to have a KLV structure. Further, the KLV encoder 125 adds, to the KLV structure of the multiplexed audio data corresponding to each frame, a KLV structure of a filler of a length corresponding to a shortage from the data length of a sound item, which is a fixed length, thereby to form a sound item. Then, the KLV encoder 125 supplies the thus formed sound item to the data synthesis section 107 (FIG. 14).

Figure 17:
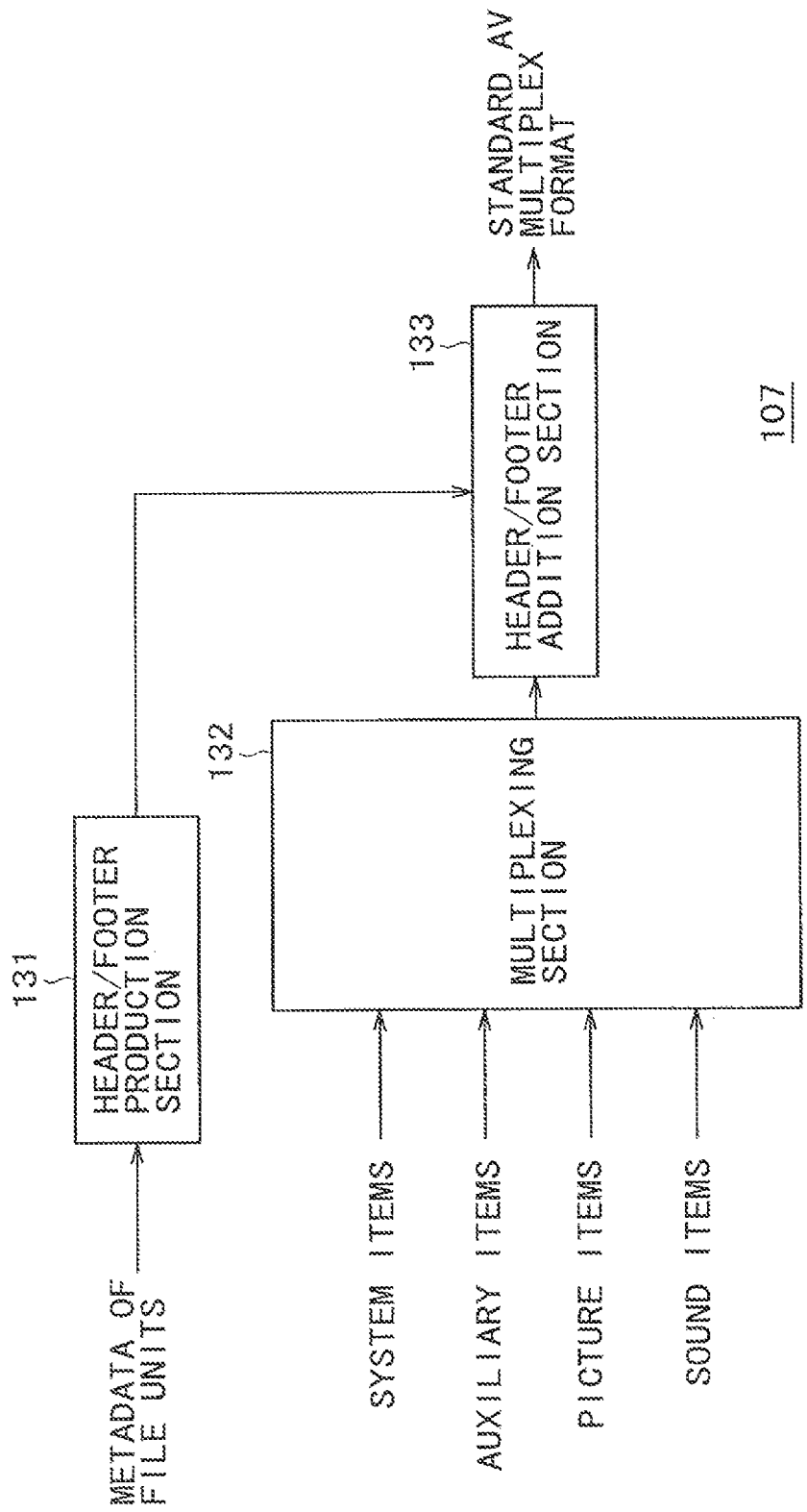
FIG. 17 is a block diagram showing an example of a data synthesis section shown in FIG. 14.

FIG. 17 shows an example of a configuration of the data synthesis section 107 shown in FIG. 14.

A header/footer production section 131 receives metadata of file units outputted from the metadata file processing section 103. The header/footer production section 131 produces a header and a footer of a file of the standard AV multiplex format and places the metadata of file units from the metadata file processing section 103 into the header metadata of the header. Then, the header/footer production section 131 supplies the header and the footer to a header/footer addition section 133.

A multiplexing section 132 receives system items outputted from the metadata file processing section 103, auxiliary items outputted from the auxiliary file processing section 104, picture items outputted from the video file processing section 105, and sound items outputted from the audio file processing section 106. The multiplexing section 132 successively multiplexes the system items, picture items, sound items, and auxiliary items supplied thereto in this order to form a sequence of edit units. Then, the multiplexing section 132 supplies the sequence of edit units as a body to the header/footer addition section 133.

The header/footer addition section 133 adds the header and the footer supplied thereto from the header/footer production section 131 to the body supplied thereto from the multiplexing section 132 to form a file of the standard AV multiplex format. As a result, the section 133 outputs the file of the standard AV multiplex format.

Referring back to FIG. 14, the independent/standard conversion section 22 performs a metadata file process for processing a metadata file, an auxiliary file process for processing an auxiliary file, a video file process for processing a video file, and an audio file process for processing audio files. The independent/standard conversion section 22 further performs a synthesis process for preparing a file of the standard AV multiplex format through synthesis using results of the processes mentioned above.

The metadata file process, auxiliary file process, video file process, audio file process, and synthesis process performed by the independent/standard conversion section 22 are described below with reference to flow charts of FIGS. 18 to 22.

Figure 18:
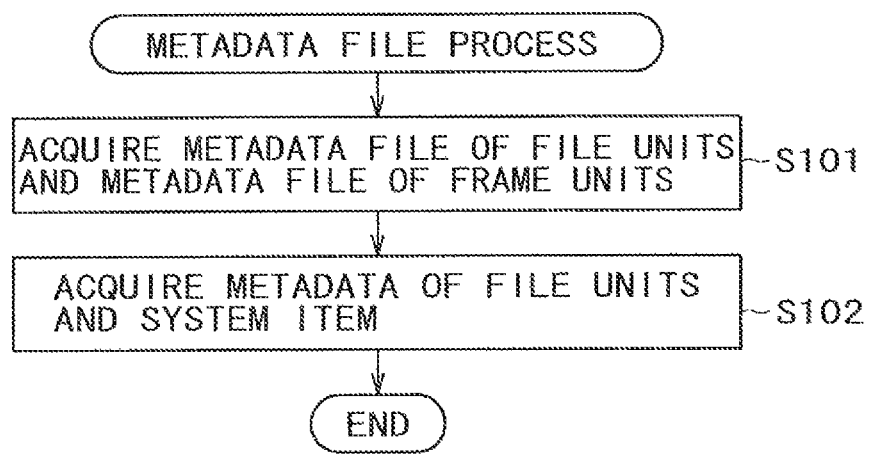
FIG. 18 is a flow chart illustrating a metadata file process executed by the independent/standard conversion section shown in FIG. 14.

First, the metadata file process is described with reference to the flow chart of FIG. 18.

The metadata file process is started, for example, when a master file is read out from an optical disk 7 by the disk driving section 11 and stored into the buffer 101.

First, at step S101, the file acquisition section 102 refers to the master file stored in the buffer 101 to recognize the file names of the metadata files of file units and frame units. Further, at step S101, the file acquisition section 102 accesses the disk driving section 11 to read out the metadata files of file units and frame units from the optical disk 7 based on the file names through the buffer 101 to acquire the files. Then, the file-acquisition section 102 supplies the acquired metadata files to the metadata file processing section 103. Then, the processing advances to step S102. At step S102, the metadata file processing section 103 extracts, from within the metadata file of the file units supplied thereto from the file acquisition section 102, the metadata of file units. Further, the metadata file processing section 103 extracts, from within the metadata file of the frame units, system items in which the metadata of the frame units are placed. Then, the metadata file processing section 103 supplies the extracted metadata of file units and the system items to the data synthesis section 107. The metadata file process is ended thereby.

Figure 19:
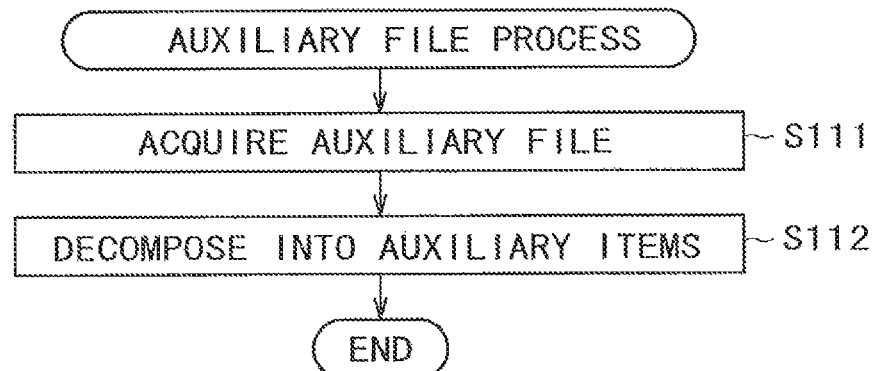
FIG. 19 is a flow chart illustrating an auxiliary file process executed by the independent/standard conversion section shown in FIG. 14.

Now, the auxiliary file process is described with reference to the flow chart of FIG. 19.

The auxiliary file process is started, for example, when a master file is read out from an optical disk 7 by the disk driving section 11 and stored into the buffer 101.

First at step S111, the file acquisition section 102 refers to the master file stored in the buffer 101 to recognize the file name of the auxiliary file. Further, at step S111, the file acquisition section 102 accesses the disk driving section 11 to read out the auxiliary file from the optical disk 7 based on the file name through the buffer 101 to acquire the auxiliary file and supplies the acquired auxiliary file to the auxiliary file processing section 104. Then, the processing advances to step S112.

At step S112, the auxiliary file processing section 104 decomposes the auxiliary file supplied thereto from the file acquisition section 102 into auxiliary items to extract or acquire auxiliary items from the auxiliary file. The section 104 supplies the auxiliary items to the data synthesis section 107. The auxiliary file process is ended thereby.

Figure 20:
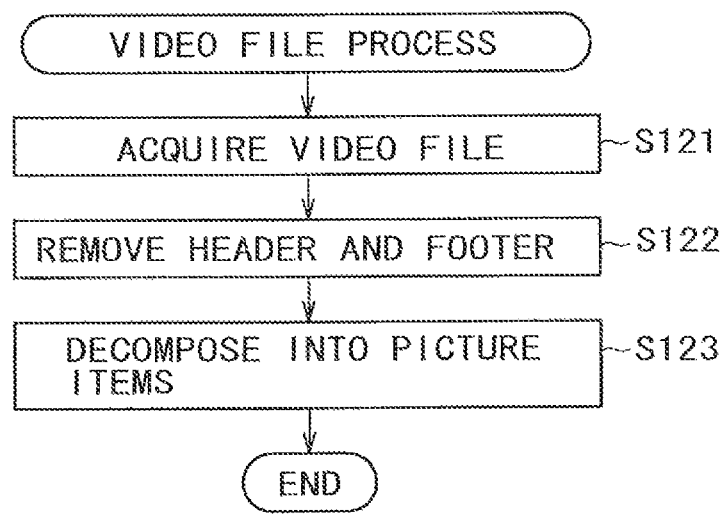
FIG. 20 is a flow chart illustrating a video file process executed by the independent/standard conversion section shown in FIG. 14.

Now, the video file process is described with reference to the flow chart of FIG. 20.

The video file is started, for example, when a master file is read out from an optical disk 7 by the disk driving section 11 and stored into the buffer 101.

First at step S121, the file acquisition section 102 refers to the master file stored in the buffer 101 to recognize the file name of the video file. Further, at step S121, the file acquisition section 102 accesses the disk driving section 11 to read out the video file from the optical disk 7 based on the file name through the buffer 101 to acquire the video file and supplies the video file to the video file processing section 105. Then, the processing advances to step S122.

At step S122, the header/footer removal section 111 of the video file processing section 105 (FIG. 15) removes a header and a footer from the video file supplied thereto from the file acquisition section 102 and supplies the body remaining as a result of the removal to the decomposition section 112. Then, the processing advances to step S123. At step S123, the decomposition section 112 decomposes a sequence of picture items placed in the body supplied thereto from the header/footer removal section 111 into individual picture items and supplies the picture items to the data synthesis section 107. The video file process is ended thereby.

Figure 21:
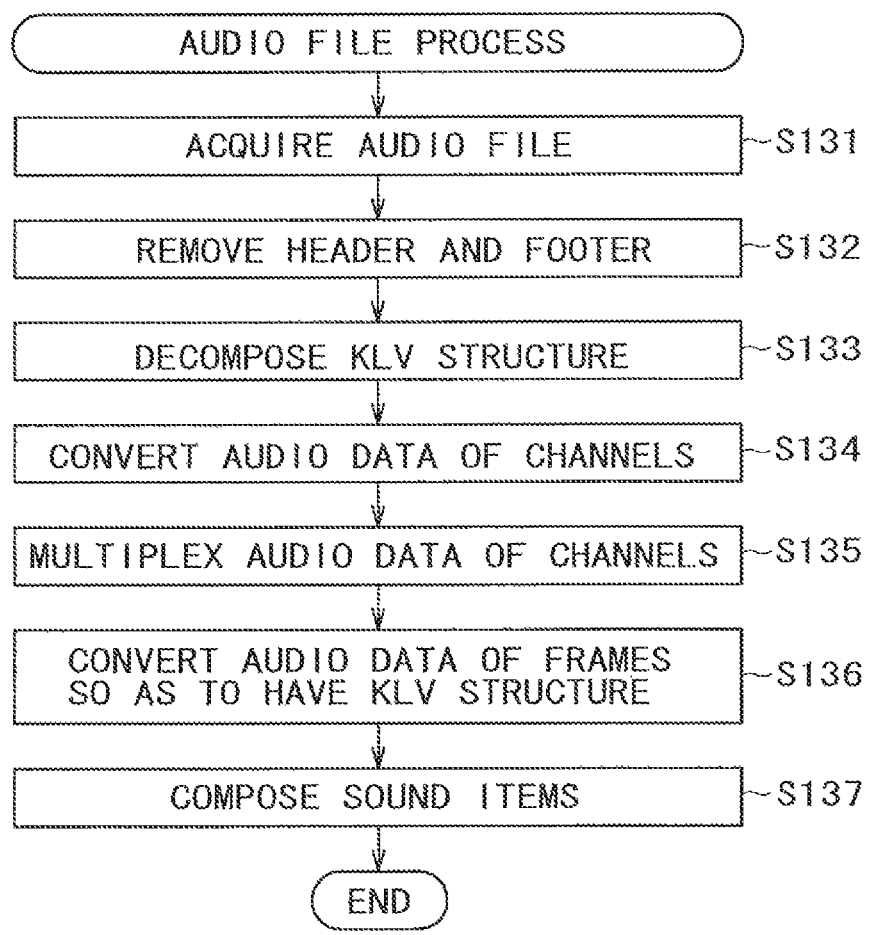
FIG. 21 is a flow chart illustrating an audio file process executed by the independent/standard conversion section shown in FIG. 14.

Now, the audio file process is described with reference to the flow chart of FIG. 21.

The audio file process is started, for example, when a master file is read out from an optical disk 7 by the disk driving section 11 and stored into the buffer 101.

First at step S131, the file acquisition section 102 refers to the master file stored in the buffer 101 to recognize the file names of audio files of eight channels. Further, at step S131, the file acquisition section 102 accesses the disk driving section 11 to read out the audio files of eight channels from the optical disk 7 based on the file names through the buffer 101 to acquire the audio files of eight channels. Then, the file acquisition section 102 supplies the audio files of eight channels to the audio file processing section 106. Thereafter, the processing advances to step S132.

At step S132, the header/footer removal section 121 of the audio file processing section 106 (FIG. 16) removes a header and a footer from each of the audio files of eight channels supplied thereto from the file acquisition section 102 and supplies the bodies of the channels remaining as a result of the removal to the KLV decoder 122. Then, the processing advances to step S133. At step S133, the KLV decoder 122 decomposes the KLV structure of the bodies of the channels supplied thereto from the header/hooter removal section 121 and supplies the audio data of the WAVE form of the channels obtained by the decomposition to the data conversion section 123. Then, the processing advances to step S134.

At step S134, the data conversion section 123 converts the audio data of the channels of the WAVE form supplied thereto from the KLV decoder 122 into audio data of the channels of the AES3 form and supplies the audio data of the channels of the AES3 form to the channel multiplexing section 124. Then, the processing advances to step S135. At step S135, the channel multiplexing section 124 multiplexes the audio data of the channels supplied thereto from the channel multiplexing section 124 and supplies the multiplexed audio data obtained by the multiplexing to the KLV encoder 125. Then, the processing advances to step S136.

At step S136, the KLV encoder 125 delimits the multiplexed audio data supplied thereto from the channel multiplexing section 124 into units corresponding to frames of the video data and KLV-encodes the multiplexed audio data corresponding to the frames into multiplexed audio data of the KLV structure. Then, the processing advances to step S137. At step S137, the KLV encoder 125 adds a necessary KLV structure of a filler to the KLV structure of the multiplexed audio data corresponding to each of the frames to produce a sound item. Then, the KLV encoder 125 supplies the sound items produced in this manner to the data synthesis section 107. The audio file process is ended thereby.

Figure 22:
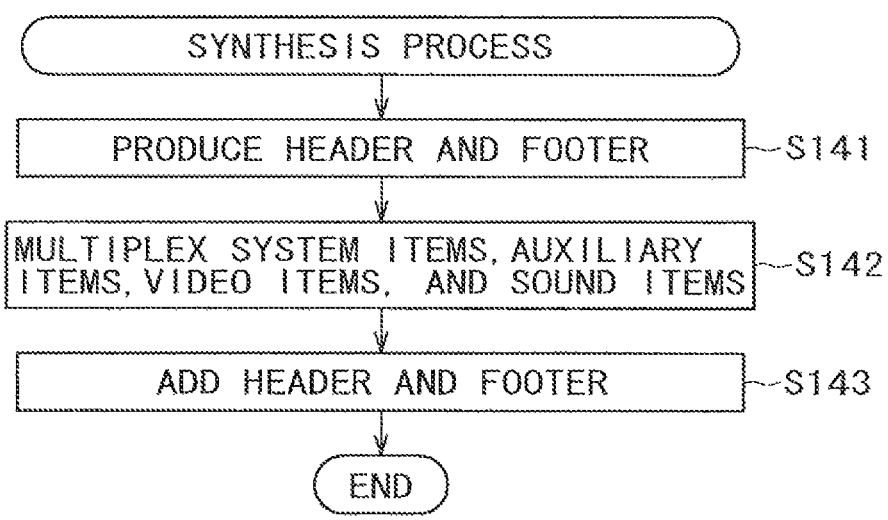
FIG. 22 is a flow chart illustrating a synthesis process executed by the independent/standard conversion section shown in FIG. 14.

Now, the synthesis process is described with reference to the flow chart of FIG. 22.

The synthesis process is started, for example, when required items are supplied to the data synthesis section 107. The required items are metadata of file units and system items from the metadata file processing section 103, auxiliary items from the auxiliary file processing section 104, picture items from the video file processing section 105, and sound items from the audio file processing section 106.

First at step S141, the header/footer production section 131 of the data synthesis section 107 (FIG. 17) produces a header and a footer of a file of the standard AV multiplex format and places the metadata of file units from the metadata file processing section 103 into the header metadata of the header. Further, at step S141, the header/footer production section 131 supplies the header and the footer-obtained in such a manner as described above to the header/footer addition section 133. Thereafter, the processing advances to step S142.

At step S142, the multiplexing section 132 multiplexes the system items outputted from the metadata file processing section 103, the auxiliary items outputted from the auxiliary file processing section 104, the picture items outputted from the video file processing-section 105, and the sound items outputted from the audio file processing section 106. Then, the multiplexing section 132 supplies a sequence of edit units obtained by the multiplexing as a body to the header/footer addition section 133. Then, the processing advances to step S143.

At step S143, the header/footer addition section 133 adds the header and the footer supplied thereto from the header/footer production section 131 to the body supplied thereto from the multiplexing section 132 to form a file of the standard AV multiplex format and outputs the file of the standard AV multiplex format. The synthesis process is ended thereby.

While the series of processes described above can be executed by hardware, it may otherwise be executed by software. Where the series of processes is executed by software, a program, which constructs the software, is installed into a computer for universal use or a like apparatus.

Figure 23:
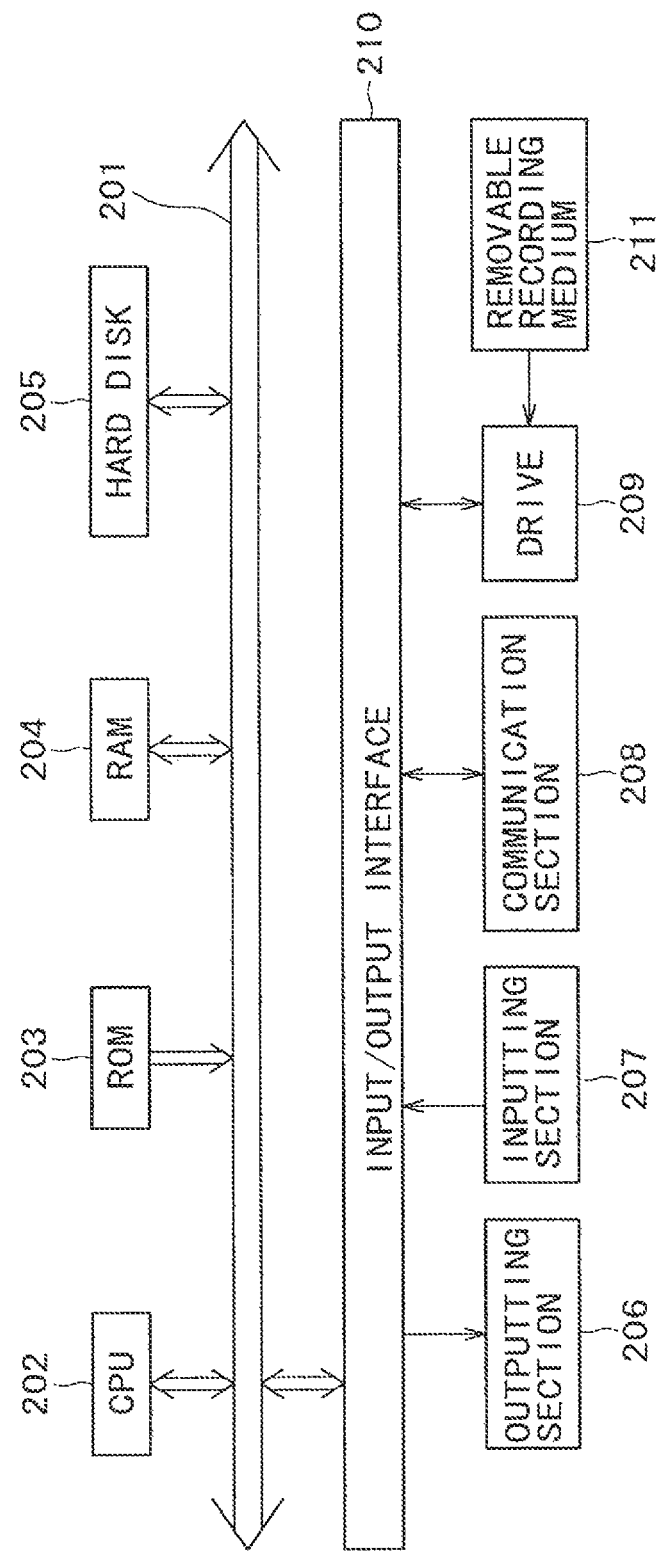
FIG. 23 is a block diagram showing an example of a configuration of a computer to which the present invention is applied.

FIG. 23 shows an example of a configuration of a computer into which a program for executing the series of processes described above is installed.

The program can be recorded in advance on a hard disk 205 or a Read Only Memory (ROM) 203 built in the computer and serving as a recording medium.

It is otherwise possible to temporarily or permanently store or record the program on a removable recording medium 211 such as a flexible disk, a Compact Disc-Read Only Memory (CD-ROM), an Magneto-Optical (MO) disk, a Digital Versatile Disk (DVD), a magnetic disk, or a semiconductor-memory. The removable recording medium 211 of the type described can be provided as package software.

It is to be noted that the program may be installed by a different method from the method described above wherein the program is installed from such a removable recording medium 211 into the computer as described above. In particular, it is possible to transfer the program from a download site to the computer by wireless communication through an artificial satellite for digital satellite broadcasting or to transfer the program to the computer by wire communication through a network such as a Local Area Network (LAN) or the Internet. The computer thus can receive the program transferred in this manner by means of a communication section 208 and install the program into a hard disk 205 built therein.

The computer has a central processing unit CPU 202 built therein. An input/output interface 210 is connected to the CPU 202 through a bus 201. If the CPU 202 receives an instruction when an inputting section 207, which may include a keyboard, a mouse or/and, a microphone, is operated by the user through the input/output interface 210, then the CPU 202 executes the program stored in the Read Only Memory (ROM) 203. Alternatively, the CPU 202 may load a program stored on the hard disk 205; a program transferred from a satellite or a network, received by the communication section 208, and installed in the hard disk 205; or a program read out from a removable recording medium 211 loaded in a drive 209 and installed in the hard disk 205 into a Random Access Memory (RAM) 204 and executes the program loaded in the RAM 204. Thus, the CPU 202 executes processing in accordance with the flow charts described hereinabove or processing to be performed by the configuration described hereinabove with reference to the block diagrams. Then, the CPU 202, for example, outputs a result of the processing from an outputting section 206, which may include an Liquid Crystal Display (LCD) unit or/and a speaker, through the input/output interface 210 as the need arises. Alternatively, the CPU 202 may transmit the result of the processing from the communication section 208 or record the result of the processing onto the hard disk 205.

In the present specification, the processing steps, which describe the program for causing a computer to execute various processes, may be but need not necessarily be processed in a time series in the order as described hereinabove with reference to the flow charts. Thus, they may include other processes, which are executed parallelly or individually without being processed in a time series such as concurrent processes or processes by objects.

Further, the program may be processed by a single computer or may otherwise be processed discretely by a plurality of computers. Furthermore, the program may be transferred to and executed by a remote computer.

In summary, mutual conversion is performed between a file of the standard AV multiplex format in which video data and audio data are placed in a multiplexed state in a body and a file of the AV independent format in which video data and audio data are placed collectively in respective bodies. Consequently, for example, in order to transmit a file through the network 4 (for file exchange or streaming), the standard AV multiplex form can be used, but in order to record a file onto the optical disk 7, the AV independent format can be used.

Then, where a file of the AV independent format is to be recorded on the optical disk 7, for example, AV independent editing (AV split editing) can be performed readily.

Further, in the AV independent format, metadata of frame units are placed collectively in one file (metadata file of frame units). Therefore, search for metadata of a frame unit can be performed at a high speed.

Furthermore, the AV independent format adopts the WAVE as a coding system for audio data. Therefore, the data amount of audio data can be reduced when compared with that in the case of the standard AV multiplex format adopting the AES3.

Further, the AV independent format adopts the form of a header, a body, and a footer same as that of the standard AV multiplex format and besides adopts, for the header and the footer, a header and a footer of the same form as that of the standard AV multiplex format. Consequently, any standard apparatus, which is ready for the standard AV multiplex format, can transmit and receive a file of the AV independent format and write and read out the file onto and from a recording medium.

Furthermore, a file of the standard AV multiplex format has a body in which a plurality of essences such as video data, audio data, user data, and metadata of frame units are placed in a multiplexed state. Meanwhile, a video file and an audio file in a file of the AV independent format have only video data and audio data placed in the body, respectively. Accordingly, a file of the AV independent format can be considered as a file of the MXF whose body includes a single essence. Contents of a video file or an audio file, which is an MXF file wherein a single essence is placed in the body, can be read out by any apparatus that can recognize an MXF file whose body includes a single essence.

It is to be noted that the disk apparatus 1 in the present embodiment writes and reads out a file of the AV independent format onto and from an optical disk 7. However, a file of the AV independent format can be written and read out not only onto and from a recording medium of the disk type such as the optical disk 7 but also onto and from any other recording medium such as a recording medium of the tape type such as a magnetic tape or a semiconductor memory.

Further, in the embodiment of FIG. 1, the disk apparatus 1, which is one apparatus, is composed of the disk driving section 11, format conversion section 12, and communication interface 13. However, each of the disk driving section 11, format conversion section 12, and communication interface 13 may otherwise be formed as a single independent apparatus.

Furthermore, in the present embodiment, a file conforming to the MXF is adopted as a file of the standard AV multiplex format. However, not only a file, which conforms to the MXF, but also any file including a header, a body, and a footer and having multiplex data of two or more arbitrary data placed in the body can be adopted as a file of the standard AV multiplex format.

Further, in the present embodiment, multiplexed data of video data and audio data are placed in the body of a file of the standard AV multiplex format. However, for example, multiplex data of two or more (streams of) different video data or multiplex data of two or more (streams of) different audio data may be placed in the body of a file of the standard AV multiplex format.

While a preferred embodiment of the present invention has been described using specific terms, such description is for illustrative purpose only, and it is to be understood that changes and variations may be made without departing from the spirit or scope of the following claims.

What is claimed is:

1. A conversion apparatus for converting a media file into different formats, comprising:
    conversion means for converting the media file between a first format and a second format;
    wherein both the first format and the second format have a header, a body, and a footer in the media file,
    wherein the header of the first format has the same form as the header of the second format, and the footer of the first format has the same form as the footer of the second format,
    wherein video data, audio data and metadata of a frame unit are placed in a multiplexed state in the body of the media file of the first format; and
    wherein when the media file of the first format is converted into the second format, only the video data is collectively placed in the body of a video file of the second format, and only the audio data is collectively placed in the body of an audio file of the second format, and
    wherein the conversion means includes:
        metadata of frame unit extracting means for extracting metadata of frame unit from the body,
        metadata file of frame unit generating means for generating metadata file of frame unit in which the metadata of frame unit are placed,
        metadata of file unit extracting means for extracting metadata of file unit from the header; and
        metadata file of file unit generating means for generating metadata file of file unit in which said metadata of file unit are placed.

2. The conversion apparatus according to claim 1, wherein the first format includes an MXF format, and the second format allows the video data and the audio data to be independently edited.

3. The conversion apparatus according to claim 1, wherein a KLV structure is used for both the video data included in the media file of the first format and the video data included in the media file of the second format.

4. The conversion apparatus according to claim 1, wherein audio data of a plurality of channels are included in separate audio files of the second format, each file being dedicated to include only the audio data of a single channel.

5. The conversion apparatus according to claim 1, wherein the second format also includes a master file describing pointers to related files in the second format.

6. A conversion method of a conversion apparatus for converting a media file into different formats, comprising the steps of:
    converting the media file between a first format and a second format;
    wherein both the first format and the second format include a header, a body, and a footer in the media file; the header of the first format has the same form as the header of the second format, and the footer of the first format has the same form as the footer of the second format,
    wherein video data, audio data and metadata of frame unit are placed in a multiplexed state in the body of the media file of the first format; and
    wherein when the media file of the first format is converted into the second format, only the video data is collectively placed in the body of a video file of the second format, and only the audio data is collectively placed in the body of an audio file of the second format, and
    wherein the conversion steps includes:
        a metadata of frame unit extracting step of extracting metadata of frame unit from the body,
        a metadata file of frame unit generating step of generating metadata file of frame unit in which the metadata of frame unit are placed,
        a metadata of file unit extracting step of extracting metadata of file unit from the header; and
        a metadata file of file unit generating step of generating metadata file of file unit in which said metadata of file unit are placed.

7. The conversion method according to claim 6, wherein the first format includes an MXF format, and the second format allows the video data and the audio data to be independently edited.

8. The conversion method according to claim 6, wherein a KLV structure is used for both the video data included in the media file of the first format and the video data included in the media file of the second format.

9. The conversion method according to claim 6, wherein audio data of a plurality of channels are included in separate audio files of the second format, each file being dedicated to include only the audio data of a single channel.

10. The conversion method according to claim 6, wherein the second format also includes a master file describing pointers to related files in the second format.

11. A non-transitory computer readable recording medium storing a program that, when executed, causes a processor to execute a conversion method for converting a media file into different formats, the conversion method comprising the steps of:
    converting the media file between a first format and a second format;
    wherein both the first format and the second format include a header, a body, and a footer in the media file; the header of the first format has the same form as the header of the second format, and the footer of the first format has the same form as the footer of the second format,
    wherein video data, audio data and metadata of frame unit are placed in a multiplexed state in the body of the media file of the first format; and
    wherein when the media file of the first format is converted into the second format, only the video data is collectively placed in the body of a video file of the second format, and only the audio data is collectively placed in the body of an audio file of the second format, and
    wherein the conversion steps includes:
        a metadata of frame unit extracting step of extracting metadata of frame unit from the body,
        a metadata file of frame unit generating step of generating metadata file of frame unit in which the metadata of frame unit are placed,
        a metadata of file unit extracting step of extracting metadata of file unit from the header; and
        a metadata file of file unit generating step of generating metadata file of file unit in which said metadata of file unit are placed.

12. The recording medium according to claim 11, wherein the first format includes an MXF format, and the second format allows the video data and the audio data to be independently edited.

13. The recording medium according to claim 11, wherein a KLV structure is used for both the video data included in the media file of the first format and the video data included in the media tile of the second format.

14. The recording medium according to claim 11, wherein audio data of a plurality of channels are included in separate audio files of the second format, each file being dedicated to include only the audio data of a single channel.

15. The recording medium according to claim 11, wherein the second format also includes a master file describing pointers to related files in the second format.

* * * * *